United States Patent [19]
Karas

[11] Patent Number: 6,038,927
[45] Date of Patent: *Mar. 21, 2000

[54] VERTICALLY MOUNTED DIFFERENTIAL PRESSURE TRANSMITTER HAVING AN INTEGRALLY MOUNTED SENSOR

[75] Inventor: Edwin L. Karas, Mansfield, Mass.

[73] Assignee: The Foxboro Company, Foxboro, Mass.

[*] Notice: This patent is subject to a terminal disclaimer.

[21] Appl. No.: 08/760,114

[22] Filed: Dec. 3, 1996

Related U.S. Application Data

[63] Continuation of application No. 08/294,090, Aug. 22, 1994, Pat. No. 5,583,294.

[51] Int. Cl.[7] .................................. G01L 7/00; G01L 9/00
[52] U.S. Cl. ................................................................ 73/706
[58] Field of Search ........................... 73/706, 716, 717, 73/715, 756

[56] References Cited

U.S. PATENT DOCUMENTS

| | | | |
|---|---|---|---|
| 4,163,964 | 8/1979 | De Filippis | 338/215 |
| 4,345,476 | 8/1982 | Singh | 73/720 |
| 4,466,290 | 8/1984 | Frick | 73/756 |
| 4,527,428 | 7/1985 | Shimada et al. | 73/706 X |
| 4,646,574 | 3/1987 | Wahl et al. | 73/741 |
| 4,665,753 | 5/1987 | Bertrand | 73/706 |
| 4,693,121 | 9/1987 | Nudd, Jr. et al. | 73/706 |
| 4,738,276 | 4/1988 | Adams | 137/343 |
| 4,970,898 | 11/1990 | Walish et al. | 73/706 |
| 4,995,266 | 2/1991 | Tobita et al. | 73/706 |
| 5,094,109 | 3/1992 | Dean et al. | 73/718 |
| 5,095,755 | 3/1992 | Peterson | 73/706 |
| 5,285,690 | 2/1994 | Koen et al. | 73/727 |
| 5,287,746 | 2/1994 | Broden | 73/706 |
| 5,531,120 | 7/1996 | Nagasu et al. | 73/706 |
| 5,583,294 | 12/1996 | Karas | 73/706 |

FOREIGN PATENT DOCUMENTS

| | | |
|---|---|---|
| 0 209 495 | 1/1987 | European Pat. Off. . |
| 0 622 620 | 11/1994 | European Pat. Off. . |
| WO 83/02004 | 6/1983 | WIPO . |
| WO 93/01480 | 1/1993 | WIPO . |
| WO 93/21506 | 10/1993 | WIPO . |

*Primary Examiner*—Joseph L. Felber
*Attorney, Agent, or Firm*—Lahive & Cockfield, LLP; Anthony A. Laurentano

[57] ABSTRACT

A pressure transmitter apparatus having a unitary body portion, separate diaphragms and flange elements and disposed within the body, a first and second normally vertical pressure passage. The first and second pressure passageways communicate respectively between first and second pressure openings extending normally horizontally through the body portion, and a transducer mounting element. The mounting element, coupled to the body portion and located above the pressure passageways, mounts a transducer that generates a differential pressure signal. One or a pair of diaphragm elements are configured to form first and second process diaphragms, closing first and second pressure openings. The flange element overlies the diaphragm element and is removably and replaceably secured to the body portion. The pressure transmitter also includes a flame retardation element that is disposed within at least one of the pressure passageways, and an overrange protection element, integrally arranged with the unitary body portion, that protects the transducer from overrange pressure fluctuations. Special flange plane geometries optimize size and sensitivity of isolation diaphragms.

42 Claims, 12 Drawing Sheets

VERTICALLY MOUNTED DIFFERENTIAL PRESSURE TRANSMITTER HAVING AN INTEGRALLY MOUNTED SENSOR

This application is a continuation application of Ser. No. 08/294,090 filed on Aug. 22, 1994, now U.S. Pat. No. 5,583,294.

BACKGROUND OF THE INVENTION

This invention relates to process control devices, and, more particularly, to improvements in differential pressure transmitters. Differential pressure transmitters measure the difference between two pressures and produce an output signal, typically with a display, responsive to the measurement.

Differential pressure transmitters are commonly used in process control systems that require pressure measurements, or measurements of other variables associated with gases and liquids, e.g., flow rates. A typical differential pressure transmitter has two process diaphragms, each exposed to one of two fluid pressures that are to be compared, and has a transducer. An inert fill fluid is provided in a closed chamber between each process diaphragm and the transducer, to transmit pressures from the process fluids to the transducer. Each process diaphragm deflects in response to the pressure of one fluid, as applied from an input process line. The transducer responds to the difference between the two pressures of the process fluid, and produces electrical output signals for indication or control. Pressure transmitters that produce electrical output signals often include electronic circuitry to process the transducer signal and to display it by way of a read-out meter, and/or to apply the processed signal to a computer or other electronic device.

Two conventional structural types of pressure transmitters are known: planar designs in which the process diaphragms share the same plane, and bi-planar designs in which the process diaphragms are in different planes and are disposed back-to-back. Conventional planar transmitters generally have an electronics housing that extends horizontally when the transmitter is oriented so that the plane of the process diaphragms is vertical. This configuration can require special hardware to mount the transmitter. Additionally, the electronics housing is displaced from the diaphragm plane in such a way that a read-out meter on the housing is often difficult to see.

Another drawback of conventional planar transmitters is that the electronic circuitry is located close to hot process lines. Specifically, in one prior configuration, the differential pressure transmitter is close to the high pressure and low pressure input process lines. These process lines can radiate heat to the transmitter electronics, thereby creating a hot operating environment. Thus, the transmitter is more susceptible to electrical malfunctions. Additionally, exposing the electronics to unnecessary elevated temperatures reduces the life of the electrical components.

A further drawback of prior transmitters is that the conventional transmitter housing assembly limits the size of the process diaphragms. A large diaphragm diameter is advantageous because it has a correspondingly low spring rate and hence aids high measuring sensitivity. The diaphragm volumetric spring rate is inversely proportional to the sixth power of the diameter of the diaphragm. However, prior pressure transmitter structures restrict the diameter of the process diaphragms to avoid undue size, which leads to a relatively large diaphragm spring rate.

Prior pressure transmitters accordingly resort to thin diaphragms, to achieve a usable spring rate. This, in turn, presents a risk of diaphragm leakage, which is a serious problem.

Conventional planar pressure transmitters endeavor to circumvent the foregoing mounting problems by using a flange adapter, in conjunction with the existing assembly that mounts the pressure transmitter. However, this solution adds weight and cost to the system.

Conventional bi-planar transmitters are relatively heavy and relatively costly. The additional weight stems at least in part from large dual process covers that mount over the process diaphragms, and from the weight of the associated cover mounting hardware.

Another drawback of both the conventional designs is that the electronic circuitry is susceptible to fluid noise, such as mechanical shocks, pipe vibrations and like mechanical disturbances. Consequently, the pressure transmitters are susceptible to producing measurement errors when mechanical disturbances occur.

Due to the foregoing and other shortcomings of conventional pressure transmitters, an object of this invention is to provide a robust differential pressure transmitter that is relatively light in weight and relatively low in cost.

Another object of the invention is to provide a pressure transmitter that has a read-out indicator that is relatively easy to view.

Still another object of the invention is to provide a transmitter housing of relatively small size that mounts process diaphragms of relatively large diameter.

Yet another object of the invention is to provide a transmitter housing that is relatively easy to install and relatively easy to mount.

A further object of the invention is to provide a pressure transmitter that shields electronic components therein from the elevated temperatures of hot process lines, and hence maintains the components in a relatively cool environment.

It is also an object of the invention to provide pressure transmitters that operate with minimal loss of performance when measuring fluids subjected to vibration and other mechanical noise.

Other general and specific objects of this invention will in part be obvious and in part be evident from the drawings and description which follow.

SUMMARY OF THE INVENTION

This invention attains the foregoing and other objects with a pressure transmitter having a body portion, a diaphragm element, a flange element, and first and second pressure passages. The body portion is generally mounted upright and includes, in that orientation, a vertical surface apertured with first and second pressure openings located at substantially the same vertical location. A transducer mounting element is coupled to the body portion and is located above the pressure openings. The diaphragm element is configured to form first and second process diaphragms respectively closing the first and second pressure openings.

This structure, in one embodiment, includes integral ribbed elements that provide support and add structural stiffening to the body portion. The body portion preferably has a neck portion that mounts the transducer mounting element to the body portion and that provides thermal isolation therebetween.

According to one aspect of the invention, the flange element overlies the diaphragm element and is removably and replaceably secured to the body portion. The flange element is configured to form first and second pressure ports that couple fluids in first and second pressure input lines to the first and second process diaphragms, respectively.

The first and second pressure passages extend at least partly within the body portion, and communicate respectively between the first and second pressure openings and the transducer mounting element. The pressure transmitter according to the invention has a flame retardation element disposed in at least one of the first and second pressure passages to be in the fluid path between a sensor element in the transducer mounting portion and a process input line. The flame retardation element thus introduces a flame barrier between the mounted sensor element and a process fluid being measured.

According to further aspects of the invention, the transducer mounting element mounts a sensor element that is in fluid communication with the first and second pressure passageways and that is located, in the upright orientation of the body portion, above the process diaphragms. The sensor element includes a transducer, located at least partly between opposed first and second faces of the sensor element, for generating a differential pressure signal. The transducer responds to the difference in pressure between the pressures applied to the first and second pressure ports.

The sensor element preferably has an overrange protection element that protects the transducer from overrange pressure fluctuations. In a preferred embodiment, the overrange protection element overlies at least the first pressure passageway, and is integral with the body portion.

According to other aspects of the invention, the body portion preferably is a unitary structure, and preferably includes a support element for removably and replaceably attaching the body portion to a mounting pipe or other external transmitter support structure.

In one preferred embodiment of a pressure transmitter according to the invention, the body portion is configured with the first and second pressure openings oppositely arranged and substantially parallel to each other. In one embodiment, for example, the pressure openings are arranged back to back. The flange element includes first and second process covers that respectively overlie the first and second process diaphragms. Fastener elements, typically threaded such as machine bolts, secure each process cover to the body portion.

In another preferred embodiment of a pressure transmitter according to the invention, the first and second pressure openings are planar and are located horizontally side by side. In this embodiment, the process diaphragms of the diaphragm element, which overlies the first and second pressure openings, are formed in the same plane. To mount the flange element, the body portion has fastener-receiving apertures preferably located at least at two corners of a path bounding a non-square quadrilateral. Fastener elements in these apertures removably and replaceably secure the flange element to the body portion. In one preferred embodiment, the fastener-receiving apertures are located at each of four corners of the non-square quadrilateral. One preferred form of the quadrilateral is a parallelogram having an acute included angle of typically between 30 and 40 degrees. In a preferred configuration, the acute angle is about 34 degrees.

The foregoing location of the fasteners and apertures, i.e., at corners of a non-square quadrilateral, accommodates large diameter process diaphragms in a relatively small space. It thus enables the pressure transmitter to operate with relatively high sensitivity and yet have relatively small size.

The body portion of the pressure transmitter according to the latter preferred embodiment has a web-like structure that forms, in an upright orientation, a vertically extending and planar front surface spaced from a rear face. Fastener receiving apertures extend through the web-like structure, i.e. between the front surface and the rear face, and partly through the flange element. This arrangement allows the fastener elements to mount from the rear face of the web-like structure to secure the flange element to the front surface of the body portion.

According to still further aspects of the invention, the flame retardation element and the overrange protection element are, fluidwise, connected in series. The overrange protection element preferably overlies the flame retardation element that is disposed in the first pressure passageway. This configuration provides a hydraulic assembly that dampens fluid noise.

These structural features of the differential pressure transmitter, and other features set forth below, attain a pressure transmitter that is compact, relatively light weight, relatively low in cost, and relatively easy to manufacture. Further, the pressure transmitter can readily mount a readout meter disposed above the first and second pressure openings, where it is easy to view. Other features of the planar pressure transmitter include a housing of relatively small size that accommodates process diaphragms having relatively large diameters. This increase in the process diaphragm diameter reduces the diaphragm spring rate, thereby improving the accuracy of the pressure measurements.

These and other aspects of the invention are evident in the drawings and in the description which follows.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

The pressure transmitter of the first embodiment of the present invention determines the pressure difference between two input process lines. The transmitter includes a sensor body having a flange portion and a web portion and a pair of planar openings each closed by an isolation diaphragm. The diaphragms are in pressure communication with a sensor element by way of an inert fill fluid. The pressure inputs apply a pressure to the diaphragms, which is transmitted to a sensor element by the fill fluid. The sensor element generates a signal, in response to the applied pressures, indicative of the pressure difference between the two pressure inputs. The sensor body employs a diagonal bolt-hole configuration that accommodates correspondingly large diaphragms. The larger diaphragms have a correspondingly lower spring rate, and thus have a higher measuring sensitivity.

The pressure transmitter also mounts a sensor assembly uppermost on the sensor body that includes an integrally mounted overrange diaphragm. The overrange diaphragm protects the sensor element mounted within the sensor assembly from overrange pressure conditions. The sensor body also presents high thermal resistance between the input process lines and the sensor assembly, shielding the sensor and associated electronics from undesirable elevated temperatures.

The bolt-holes of the transmitter further mount fasteners that are enclosed or shrouded along the fastener length by the sensor body. The shrouded bolts help prevent the leakage of process fluid applied to the pressure ports by maintaining the temperature along the length of the bolt at or near the temperature of the sensor body.

Figure 2:
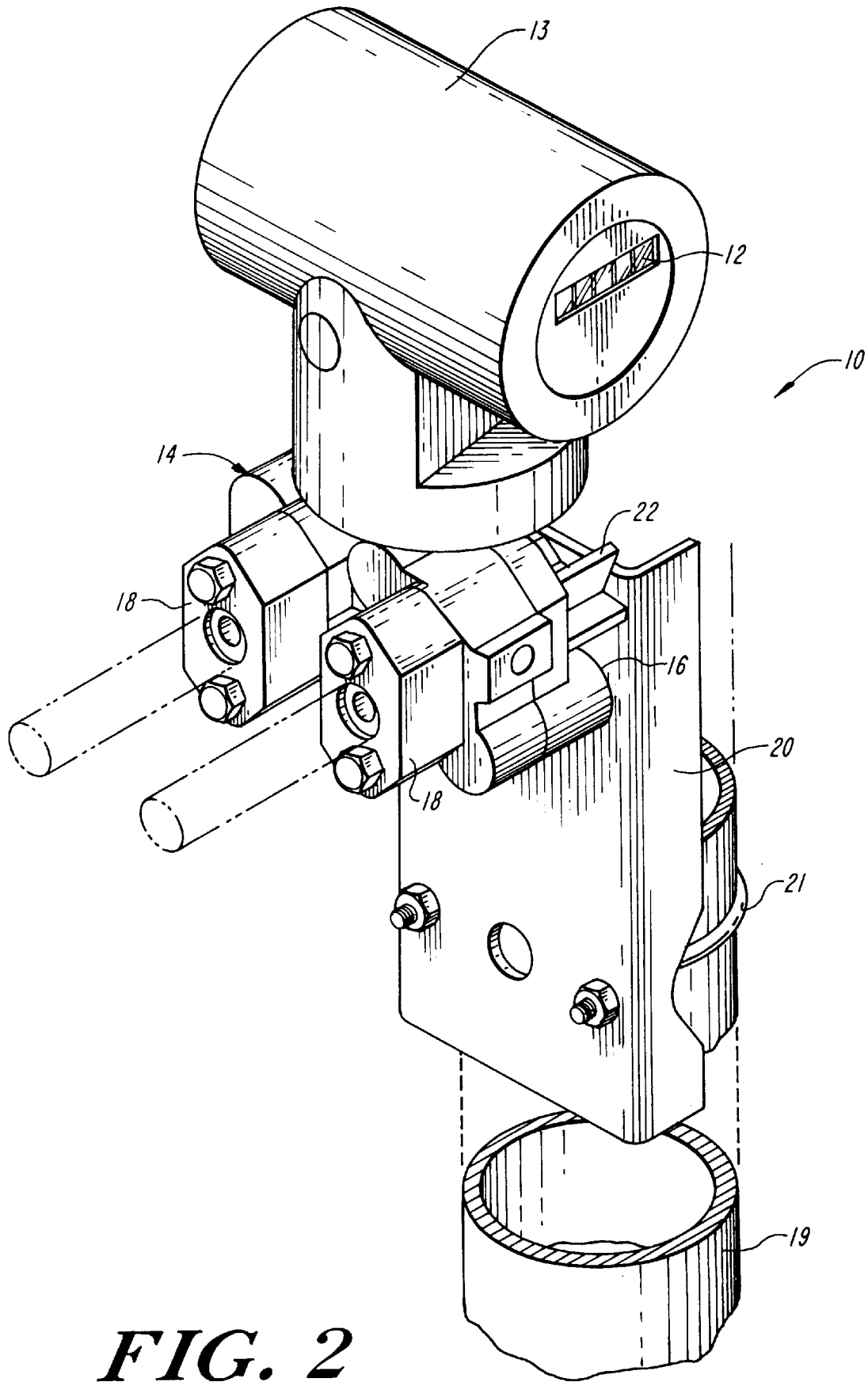
FIG. 2 is a perspective view of a pressure transmitter according to one embodiment of the invention with associated mounting hardware.

FIG. 2 shows a planar differential pressure transmitter 10 that measures the difference in pressure between two pressure inputs, i.e. between two different fluid pressures, coupled to two input process connectors 18,18. The pressure transmitter 10 has a flange 14 that receives the two pressure inputs, e.g., process lines, by way of the process connectors 18, and has a unitary body element 16 that assembles with the flange 14. In this arrangement, the unitary body element 16 conveys pressures, which are responsive to the two pressure inputs, to a transducer mounted with the body element 16, and shown in FIG. 4 as a sensing assembly 84. In response, the transducer produces a signal indicative of the difference in pressure between the two inputs. Electronic circuitry within an electronic housing 13 processes the transducer signal, and typically includes an output display 12. The housing 13 mounts on the body element 16.

The transmitter 10 mounts to a mounting bracket 20 that secures to a stationary support 19 by a mounting U-bolt 21 and associated nuts. The illustrated transmitter 10 also has a pair of support elements, shown as ribbed mounting supports 22, FIG. 7, that removably and replaceably secure the transmitter 10 to the mounting bracket 20.

Figure 3:
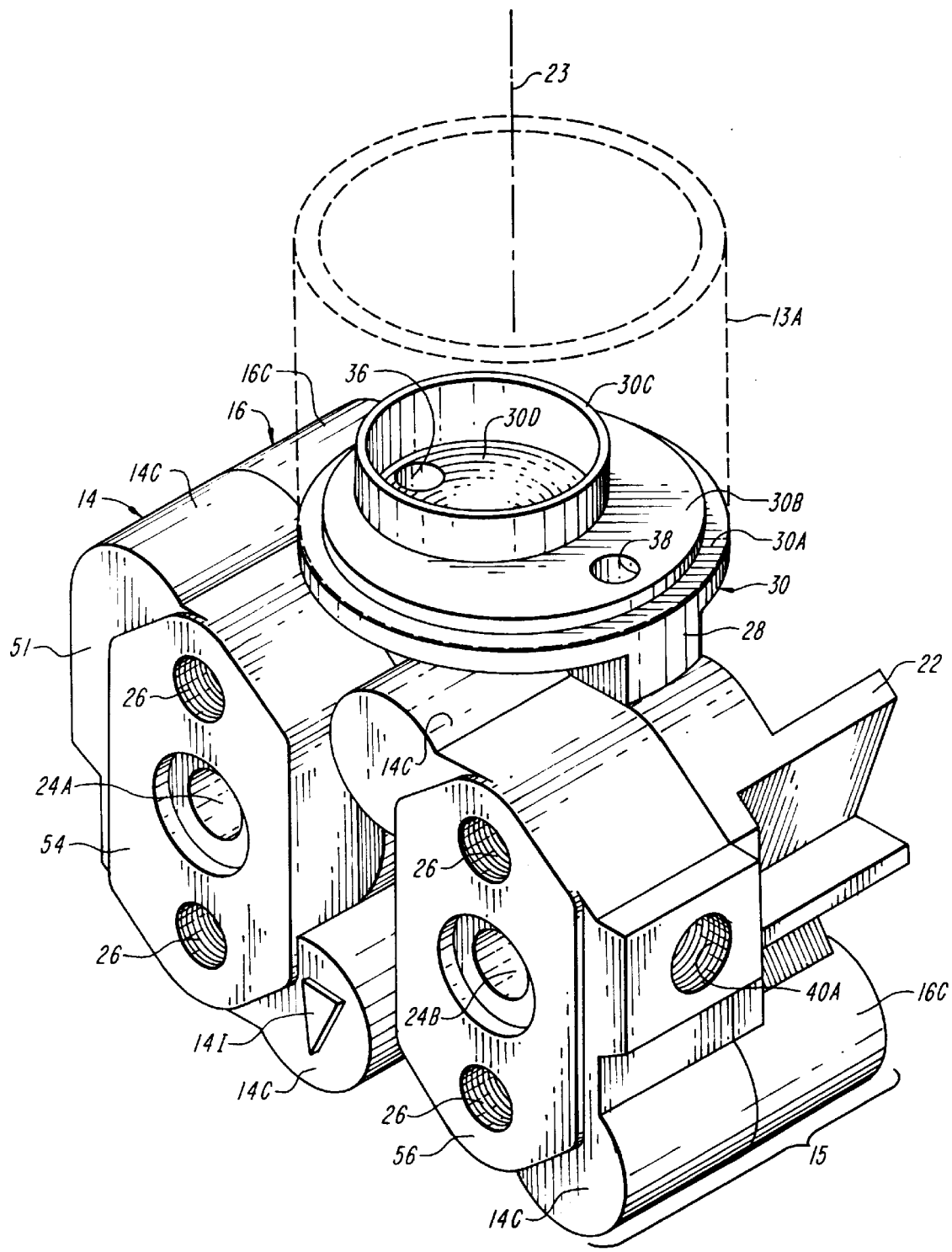
FIG. 3 is a fragmentary perspective view of the pressure transmitter of FIG. 2.

The assembled flange 14 and body element 16 of the transmitter 10 form a sensor assembly 15 that, as shown in FIG. 3, has first and second pressure ports 24A and 24B extending through the flange 14. Threaded bolt-holes 26 receive the fasteners of the process connectors 18, FIG. 2. The housing is usually installed in the upright orientation shown, where the pressure ports are horizontally spaced apart and are at the same elevation.

Figure 4:
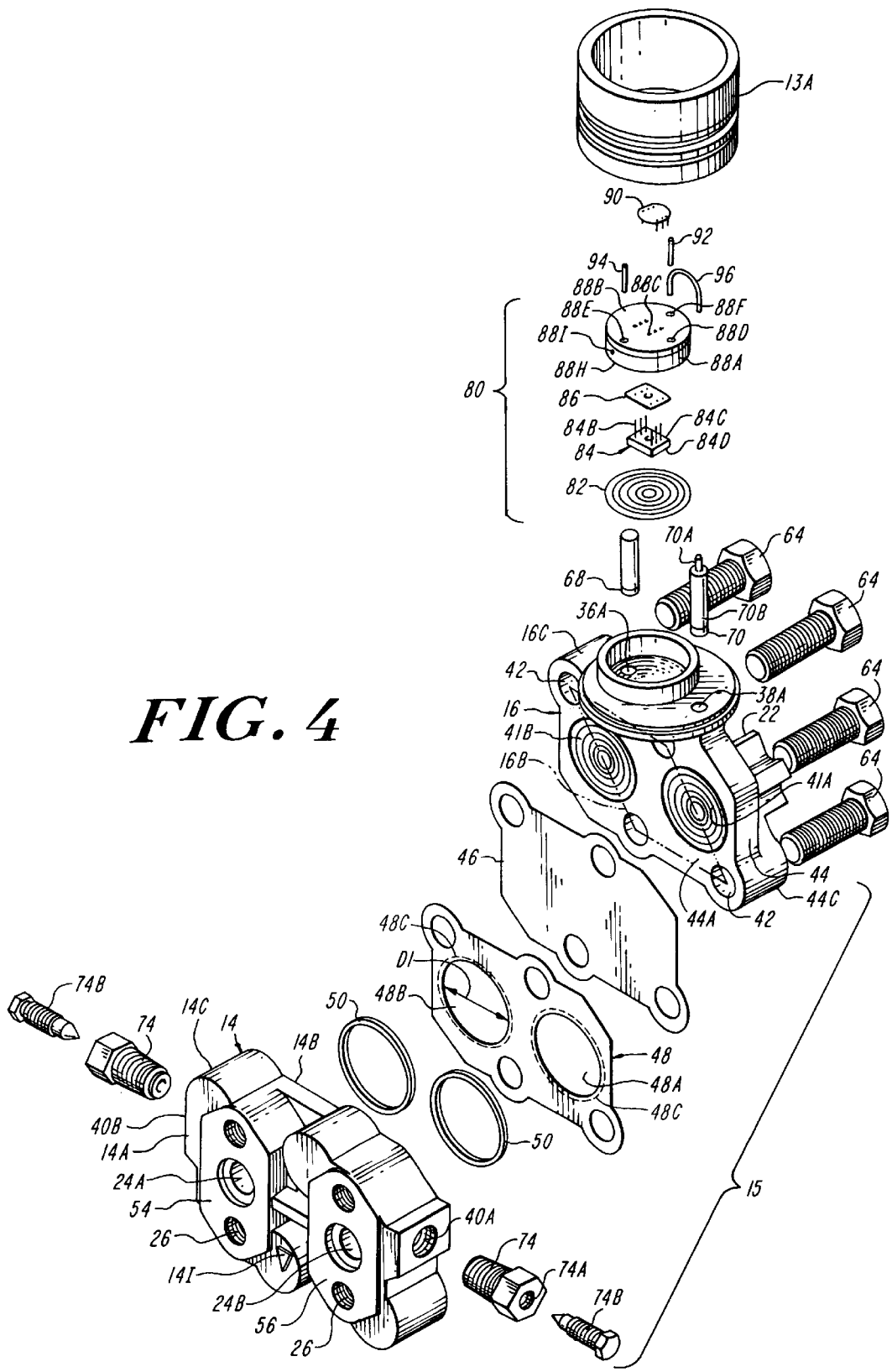
FIG. 4 is an exploded view of the pressure transmitter of FIG. 2.

The body element 16 has an integral neck portion 28 that terminates in a transducer mounting portion 30 disposed uppermost on the body element 16. The illustrated mounting portion 30 has a first annular surface 30A stepped below a concentric second surface 30B. An eccentric tubular mount 30C extends upward from the second surface 30B. In an alternate embodiment, the mount 30C can have a shape complementary to that shown in FIG. 9. The illustrated surfaces 30A and 30B are concentric with a normally vertical axis 23, and the mount 30C is offset from that axis. The floor 30D of the mount 34, illustrated as formed by the second surface 30B, is convoluted, as shown in FIGS. 3 and 4; illustratively with concentric and rounded crests and troughs. The neck portion 28 has a reduced cross-section in a plane transverse to the axis 23, to retard the conduction of heat from the pressure inputs below the neck to the electronic housing 13, to protect the sensitive electronic circuitry therein, and to the sensing assembly 84, both of which are mounted above the neck portion. A void in the structure of the neck portion 28, formed by at least one thermal resistance chamber 29 shown in FIG. 6, further reduces the neck cross-section to enhance this thermal isolation. The neck portion 28 thus provides secure mechanical support on the body portion for the transducer mounting portion 30 and for the housing 13, and yet presents a path of relatively high thermal resistance between the sensor assembly 15 and the electronic housing 13.

With further reference to FIGS. 2 and 3, the illustrated meter housing 13 seats on the sensor assembly 15 by fitting onto a mounting collar 13A in the annular shelf formed by the first and second surfaces 30A and 30B. In a preferred embodiment, the mounting collar 13A is welded to the transducer mounting portion 30 of the body portion, along the first annular surface 30A. This collar 13A retards the conduction of heat from the pressure inputs to the electronic housing 13, and thus to the heat sensitive electronic circuitry housed therein.

Figure 6:
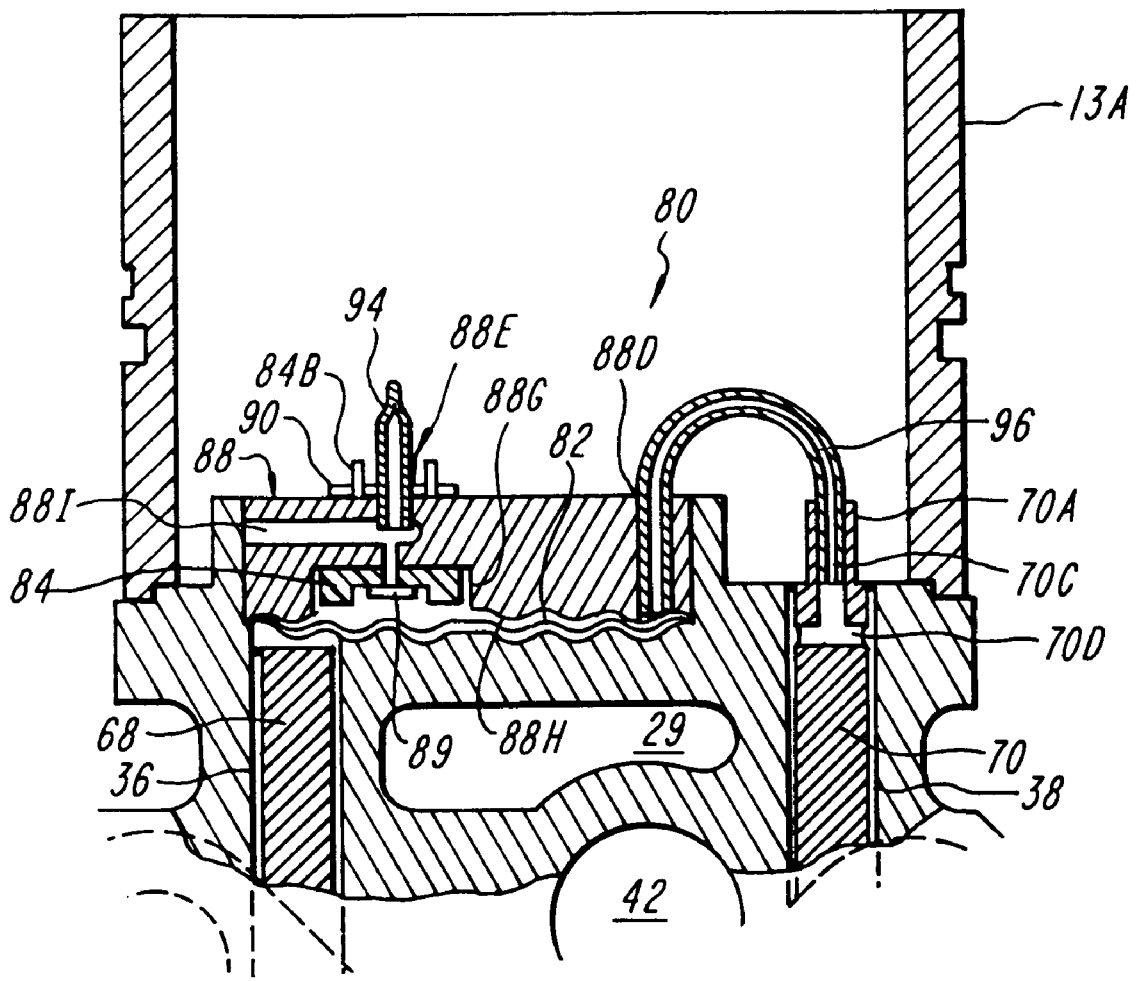
FIG. 6 is a fragmentary diagrammatic view, partly broken away, of the pressure transmitter of FIG. 4 with elements of the sensor assembly 80 diagrammatically relocated.

With reference to FIGS. 3 and 6, first and second pressure passageways 36 and 38 open to the second surface 30B and to the floor 30D, respectively, of the mounting portion 30 and extend vertically downward into the body element 16. The pressure passageways 36, 38 communicate, respectively, with transverse and hence horizontally-extending first and second pressure openings 34 and 35 (FIG. 8) in the body element 16. The pressure passageways 36, 38, along with the openings 34 and 35, communicate the pressures applied at the input pressure ports 24A, 24B to the mounting portion 30, for application to the sensing element 89.

Ventilation apertures 40A and 40B, shown in FIGS. 3, 4, 5, and 7, extend within the flange 14, transverse to and in communication with the pressure ports 24A and 24B, respectively. The ventilation apertures 40A and 40B allow fluids to be purged from the transmitter 10. In the upright orientation of the sensor assembly 15, the apertures 40A and 40B and the ports 24A and 24B extend horizontally. The ventilation apertures are closed, e.g. with threaded plugs 74, during operation of the transmitter 10.

Figure 8:
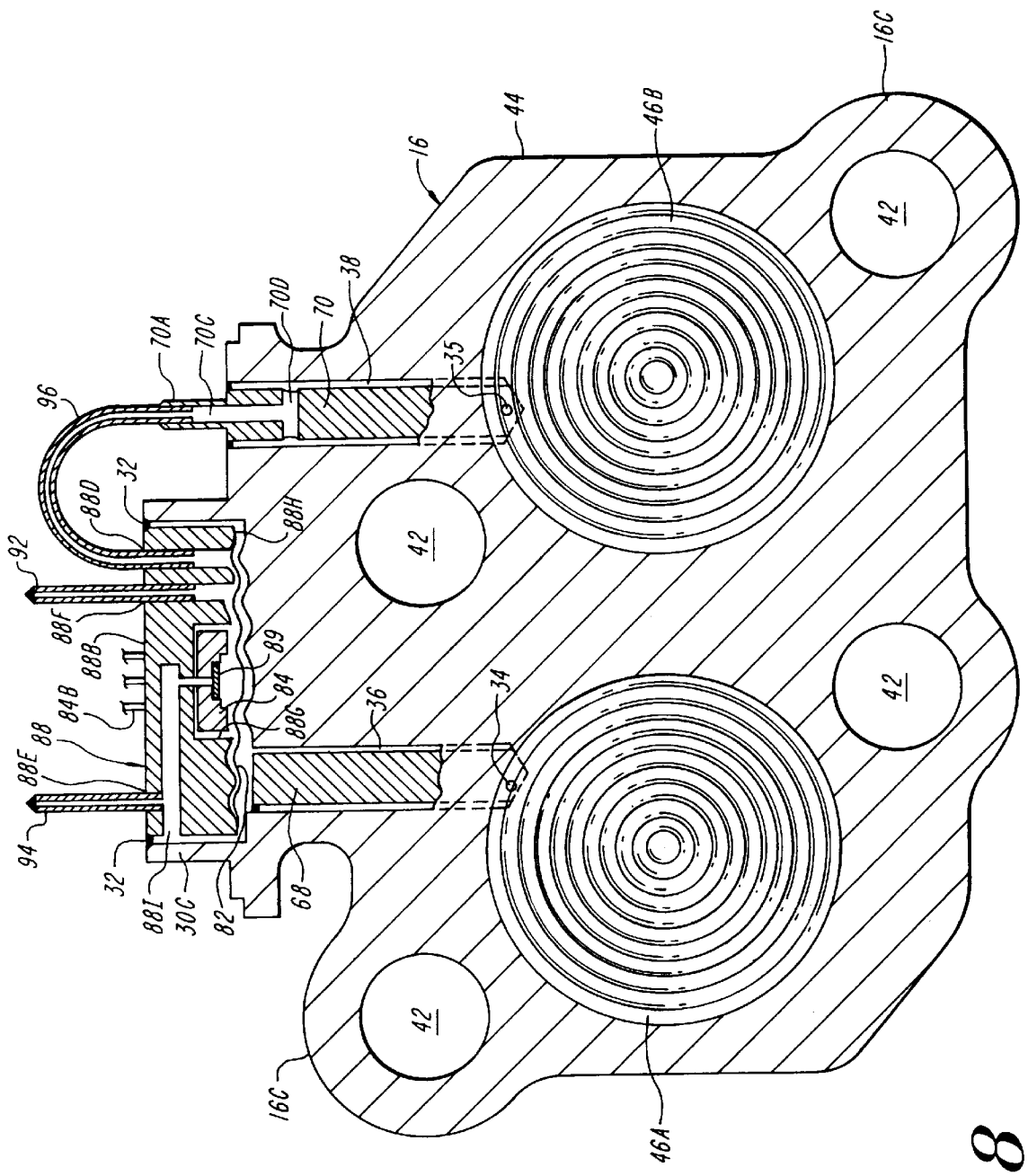
FIG. 8 is a diagrammatic sectional view of a fragment of the pressure transmitter of FIG. 3, with elements diagrammatically relocated, showing the fill fluid paths of the high and low pressure sides of the transmitter.

Referring to FIGS. 4 and 8, the illustrated body element 16 is machined from a single cast metal body. The body element 16 is structured with a normally vertical, relatively thin web 44. A front face 44A of the web 44 is substantially planar and has two circular recesses 41A and 41B, each illustrated with concentric circular convolutions. The recesses are apertured with the first and second pressure openings 34,35 (FIG. 8), respectively, which provide pressure communication between the recesses 41A and 41B and the pressure passageways 36, 38.

The illustrated body element 16 has four bolt holes 42 that extend through the web 44. The bolt holes 42 are located at the corners of a path that bounds a non-square quadrilateral. In a preferred embodiment of the invention, as shown in FIG. 4, the bolt holes 42 are located at the corners of a parallelogram, indicated with the path 16B (shown in broken lines). The parallelogram has acute included angles ranging from about 30° to about 40°, and has a preferred included acute angle of about 34°. This specific configuration accommodates correspondingly large process diaphragms.

The pair of ribbed mounting supports 22 (FIG. 7) project horizontally from the back face 44B of the normally vertical web 44. The mounting supports are configured as shown to function as mounts and as structural stiffeners for the body element 16, i.e. they stiffen the web 44 and distribute stresses throughout the body 16.

Figure 5:
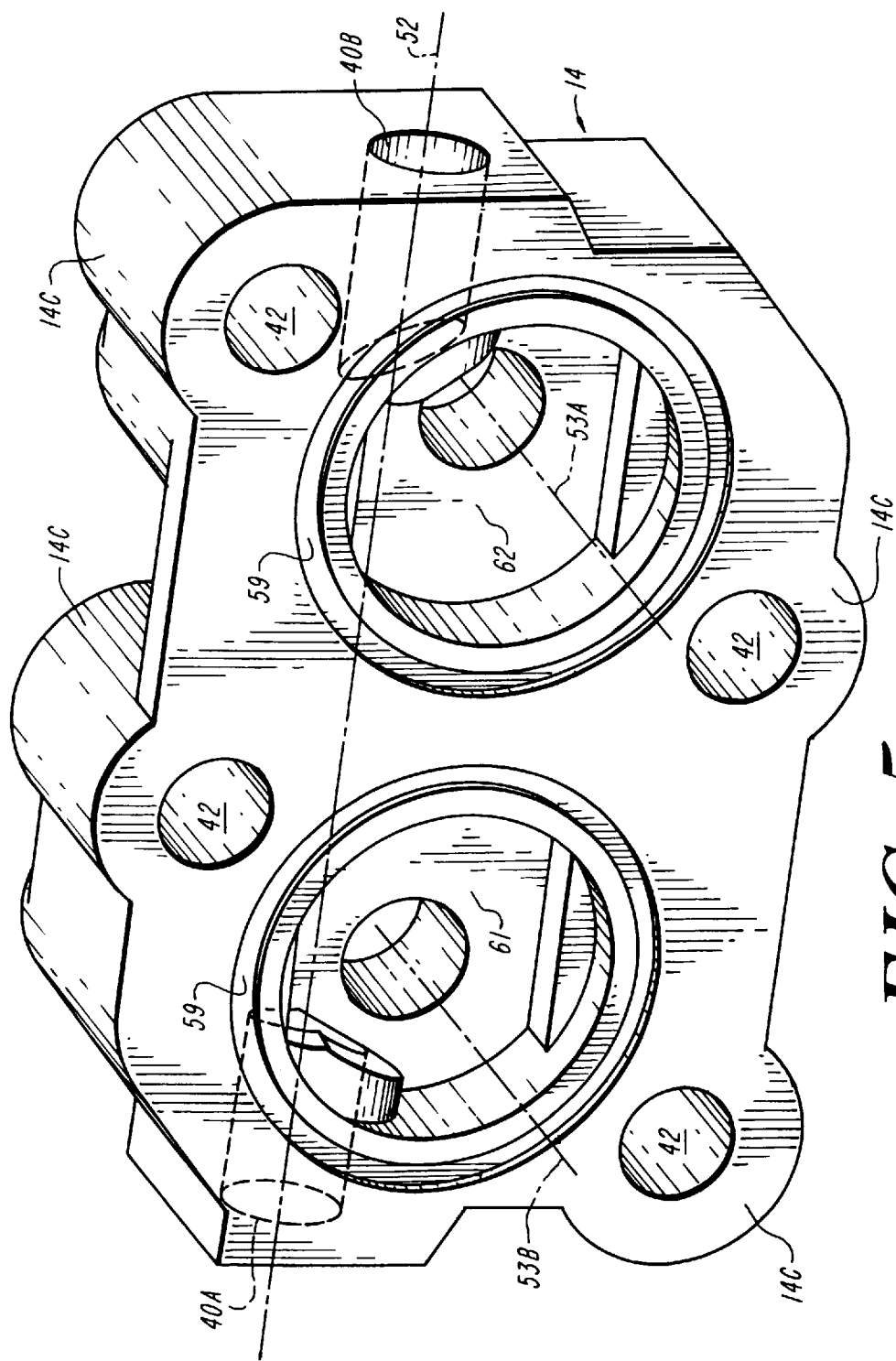
FIG. 5 is a perspective view of the flange shown in FIG. 4.
Figure 7:
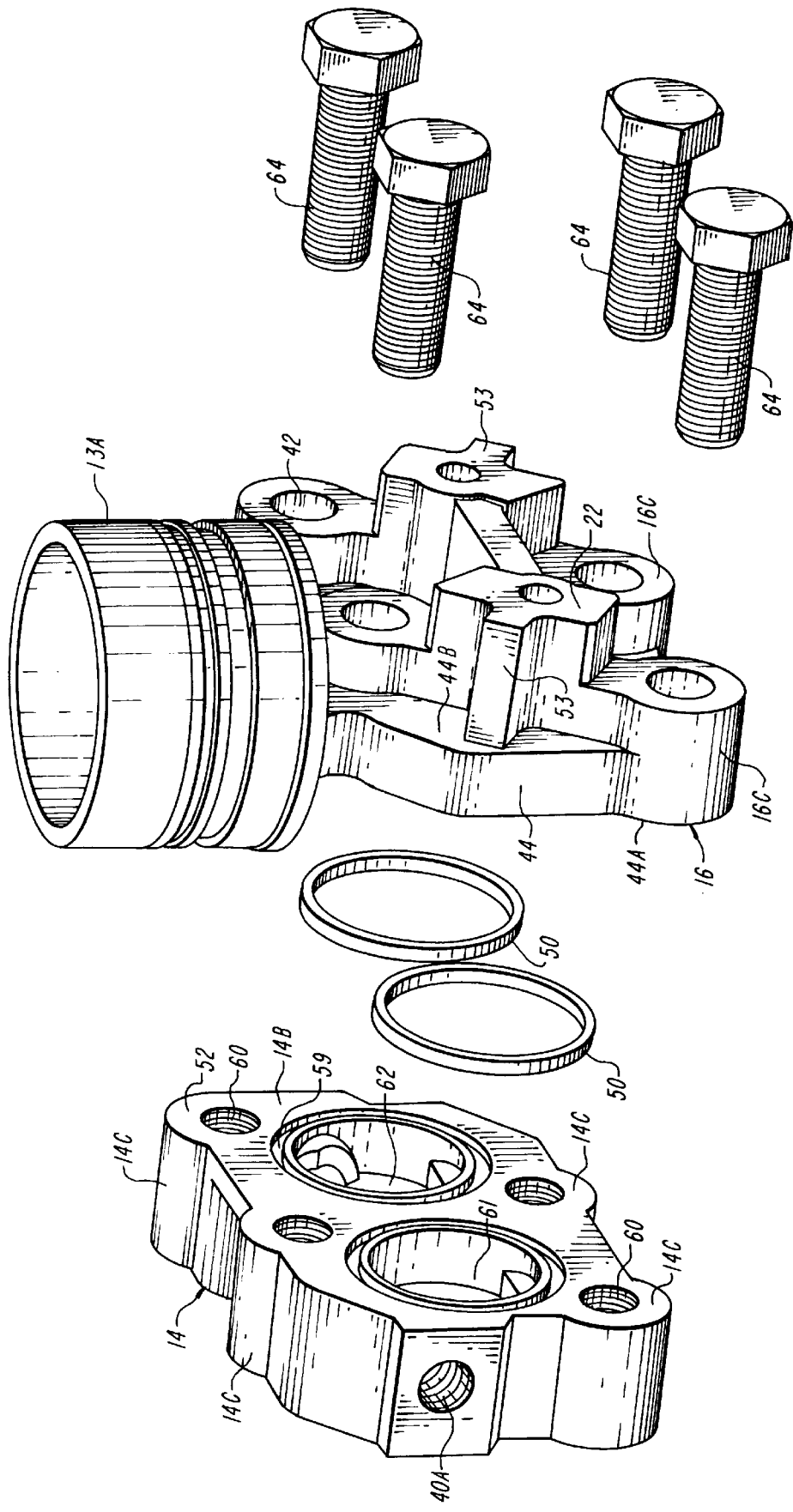
FIG. 7 is a further exploded view of selected parts of the pressure transmitter of FIG. 3.

The flange 14, shown in FIGS. 4, 5 and 7, is preferably a one-piece machined metal casting apertured with the pressure ports 24A and 24B. A rear face 14B of the flange 14, which faces toward the body element 16 in the assembled transmitter 10, is recessed with substantially circular chambers 61 and 62 in fluid communication with 24A and 24B that, in the assembled housing 15, overly the convoluted recesses 41A and 41B of the body element 16. Gasket-seating grooves 59,59 are concentric with chambers 61,62 and seat deformable gaskets 50,50. Threaded apertures 60 are formed partly through the flange 14 and receive bolts 64. The apertures 60 are located to align with the holes 42 of the body element 16.

The flange 14 and the body element 16 each have four bolt shrouds 14C and 16C, respectively, each of which encloses and thereby shrouds a bolt 64 substantially along its entire length. The flange and body element shrouds form a continuous enclosure over each bolt 64 along the passage thereof between the two assembled transmitter constituents 14 and 16. Fully shrouding each bolt maintains an axially constant temperature along the bolt length, enhancing the operational features thereof. The benefits of this feature include a reduction in the occurrence of leakage of process fluid applied to the pressure ports 24A and 24B due to the reduction of thermal loosening or corrosion in the bolts.

The illustrated ventilation apertures 40A,40B, extend within the flange 14 between the peripheral surface on either side of the flange 14 and the chambers 61 and 62, respectively. A threaded venting body 74, apertured with a central passageway 74A, seats within each ventilation aperture. A ventilation plug 74B removably and replaceably seats within the central passageway 74A, for selectively sealing the ventilation aperture closed, and alternatively for opening it for venting fluid carried to the flange 14 by the pressure ports 24A and 24B.

As best shown in FIG. 5, the ventilation apertures 40A, 40B are coaxial along an axis 52 that is transverse to the axes 53A and 53B of the pressure ports 24A and 24B, respectively. The apertures 40A,40B intersect chambers 61,62, respectively, and extend between the peripheral faces of the flange 14 and the chambers 61,62 along a geometrical chord that is offset from a horizontal diameter of the cross-section of the illustrated chambers.

When the flange 14 is assembled with the body portion 16 in the illustrated upright orientation, each ventilation aperture opens onto its corresponding chamber above the middle of the chamber. This orientation allows gases to be purged from the chamber when the ventilation plug 74B that seals the ventilation aperture is removed. Conversely, when the flange 14 is inverted, the ventilation apertures are disposed below the middle of the chambers 61,62. In this orientation, the apertures can be used to drain liquids, including condensate, from the chambers. The flange 14 preferably bears an orientation indicator 14I on an outer surface to be visually exposed and located corresponding to the illustrated vertically off-center location of the apertures 40A and 40B. Visual inspection of the indicator thus reveals whether the flange is assembled for venting, or alternatively, for draining.

A front face 14A (FIG. 4) of the flange 14, which faces away from the body element 16 in the assembled transmitter, forms two process bosses 54 and 56 and is apertured with the threaded bolt-holes 26. The process connectors 18,18 (FIG. 2) seat on the process bosses 54, 56, and are secured by bolts, FIG. 2, threaded into the bolt holes 26. The process connectors 18,18 couple the pressure ports 24A, 24B to high pressure and low pressure input process lines (FIG. 2). In a preferred embodiment, the process connectors 18,18 couple the high pressure input line to the pressure port 24B, and the low pressure input line to the pressure port 24A.

The FIG. 4 exploded view of the pressure transmitter 10 shows a thin, flat diaphragm plate 46, that is configured complementary to the web front face 44A of the body element 16, and which overlies that face, thus covering the convoluted recesses 41A, 41B. The diaphragm plate 46 has punched holes at locations complementary to the bolt-holes 42. The diaphragm plate 46 forms a planar pair of diaphragms 46A and 46B (FIG. 8) at the locations of the convoluted recesses.

With reference to FIGS. 3, 4, and 8, when the sensor assembly 15 is assembled and secured with the rear-mounting bolts 64, the two diaphragms 46A and 46B are formed from the portions of the diaphragm plate 46 overlying the convoluted recesses 41A and 41B of the body element 16. The diaphragms 46A and 46B preferably are shaped with concentric circular convolutions as shown in FIG. 8, which generally conform to and match, and are in registration with the convolutions of the recesses 41A and 41B. Further, in a preferred embodiment as illustrated, the two diaphragms 46A, 46B are formed from the same diaphragm plate, to attain closely matched diaphragm performance characteristics. Although the illustrated embodiment employs a single diaphragm plate, those skilled in the art will recognize that separate diaphragms can be employed.

With further references to FIG. 4, a thin, flat weld plate 48, also configured similar to the face 44A of the body element 16, overlies the exposed front face of the diaphragm plate 46. The weld plate 48 is apertured with holes aligned with the bolt holes and preferably has a set of two circular openings 48A and 48B, each having a diameter D1 equal to or slightly smaller than the diameter of the convoluted recesses 41A, 41B. In a preferred assembly of the sensor assembly 15 (FIG. 3), the weld plate 48 hermetically seals the diaphragm plate 46 to the body 16, as by laser welding the periphery of the weld plate 48 and the circumference of the circular openings 48A and 48B to the diaphragm plate 46 and to body element 16. The illustrated weld 48C, shown in dashed lines, is disposed about the circular openings 48A and 48B. The deformable gaskets 50,50 mount over the welds 48C formed around the openings 48A and 48B, and preferably the circumference of each is within the weld path at each opening 48A and 48B, to ensure hermetic sealing and to prevent the process medium from degrading, e.g., chemically attacking, the weld.

The diameter of each chamber 61 and 62 of the rear face 14B of the flange 14 is preferably equal to or slightly less than the diameter D1 of the weld plate openings 48A and 48B. In a preferred embodiment, the flange chambers 61 and 62 allow the input process medium applied by each process connector 18,18 to act upon the entire area of the diaphragm plate which overlies the convoluted regions, e.g., to act upon the entire areas of the diaphragms 46A and 46B circumscribed by the chambers 61,62.

The illustrated flange 14 has a peripheral shape generally complementary to the weld plate 48, the diaphragm plate 46, and the web face 44A of the body element 16. This illustrated axially successive assemblage secures the diaphragm plate 46, the weld plate 48, and the gaskets 50 between the body element 16 and the flange 14, FIGS. 3 and 4. The diaphragm plate 46, the weld plate 48, the body element 16 and the flange 14, can be made from a variety of corrosion resistant materials, such as stainless steel.

Referring again to FIG. 4, flame arrestors 68 and 70 are seated in the first and second pressure passageways 36,38, respectively, and flame arrestor 68 is secured to the body element 16, for example by tack-welding, along the mouth 36A of the pressure passageway 36. The flame arrestors are axially spaced from the walls of the passageways to form a gap having a selected size. In the illustrated embodiment, flame arrestor 70 is seated in the second pressure passageway 38 and is welded completely about the passageway mouth 38A, thus forming a fluid-tight seal. Each flame arrestor 68 and 70 functions as a flame barrier by preventing a flame, in the unlikely event one is ignited by electrical signals generated in the sensor assembly, from traveling down the pressure passageways 36,38, and into the input process lines. The flame arrestors also function as flow resistors that dampen fluid noise resulting from pipe vibrations, shock, flow turbulence and like mechanical disturbances.

The illustrated arrestor 70, in addition, has a cylindrical stem-like protrusion 70A at the upper end and a concentric longitudinally extending cylindrical main body 70B. The arrestor 70 also has a central bore 70C, FIG. 6, extending through the protrusion 70A and partly into the main body 70B. A normally-horizontal cylindrical channel 70D in the arrestor extends transverse to and bisects the central bore 70C. The horizontal channel 70D and the longitudinal bore 70C provide a passageway through which a fill fluid, e.g., hydraulic oil, passes around the flame arrestor body 70B into the pressure passageway 38. The flame arrestors 68 and 70 and the controlled gap effectively extinguish any flame front passing through the narrow passages. This occurs since the gap space cannot support a temperature sufficient to sustain the flame front.

A sensor assembly 80, illustrated in FIGS. 4, 6, and 8, includes an overrange diaphragm 82, a chip carrier 84, a mounting sheet 86 (e.g. preferably epoxy), and a header 88. The illustrated header 88 has a substantially circular solid main body 88A having a flat top face 88B from which a series of transducer lead-out holes 88C and fill tube holes 88D, 88E and 88F extend into the body 88A. Referring to FIG. 6, a substantially rectangular cavity 88G forms a recess in an opposed bottom face 88H of the header 88. The illustrated header 88 has a first opening 88D extending between the top face 88B and bottom face 88H; and a second opening 88E that extends partly through the header body 88A and communicates with a transverse cross-bore opening 88I. A third opening 88F, shown in FIG. 8, extends between the top face 88B and the bottom faces 88H, similar to the first opening 88D.

Figure 1:
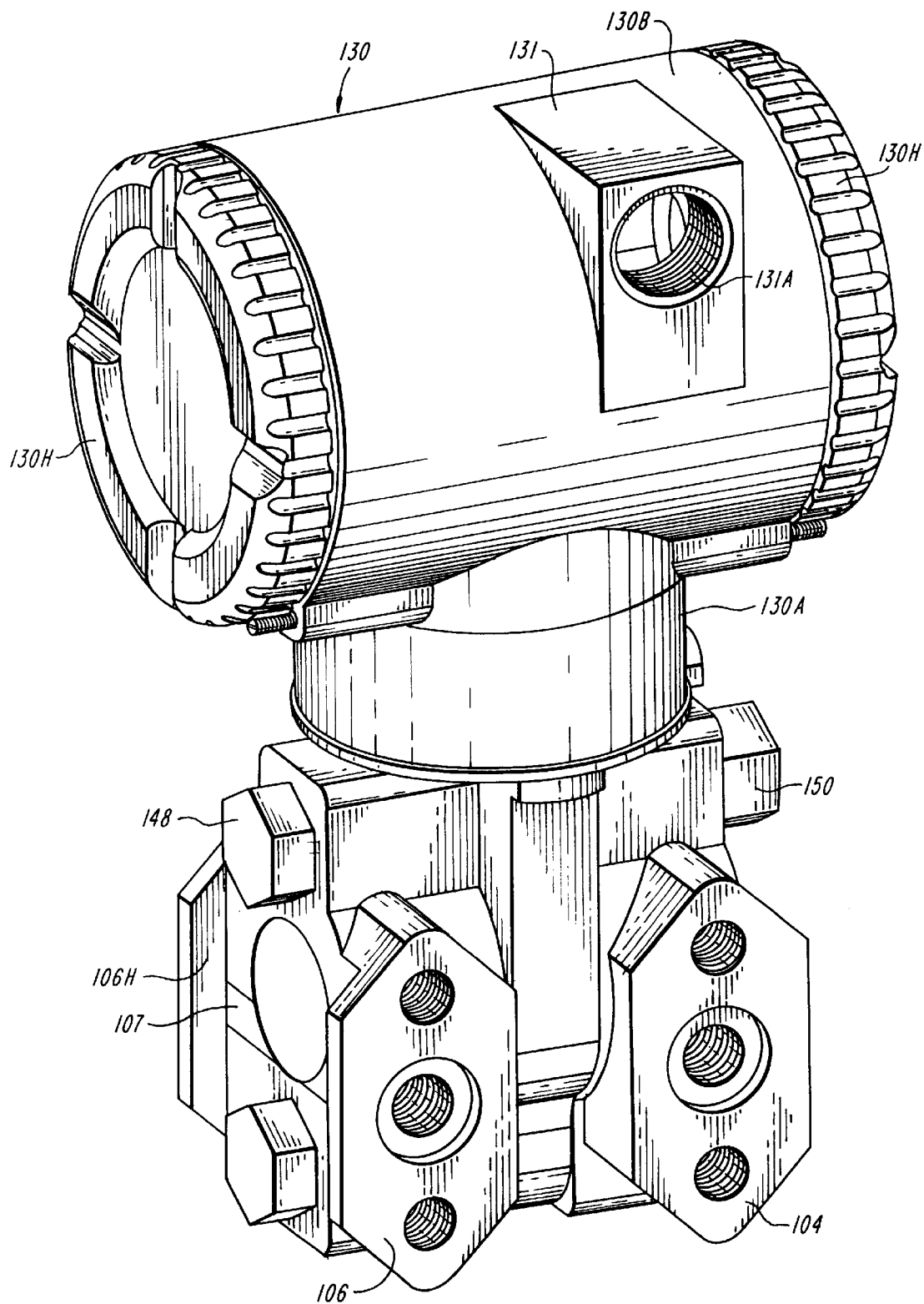
FIG. 1 is a perspective view of the bi-planar pressure transmitter of FIGS. 9 and 10.

As best shown in FIG. 8, the illustrated chip carrier 84 has a dielectric body that mounts a pressure sensing element 89. For purposes of clarity, the illustrated sensor assembly 80 has the fill tube 92 in the cross-sectional plane. A set of electrical contact pins 84B is connected by wire bonds to contacts of the sensing element 89 and extends upwardly from the top surface 84C. U.S. Pat. No. 5,285,690, incorporated herein by this reference, describes further a sensor sub-assembly suitable for use as the chip carrier 84. In the illustrated embodiment, the sensing element top surface senses the fluid pressure in the low pressure input, and the sensing element bottom surface senses the fluid pressure in the high pressure input. In another preferred embodiment, the high pressure and low pressure sides of the sensing element can be electronically switched by a digital logic module that operates with software code stored in a memory, and typically housed in the electronic housing 13 (FIGS. 1 and 2).

With further reference to FIGS. 4 and 6, the mounting sheet 86 seats over the chip carrier top surface 84C, and when heated to a selected elevated temperature, hermetically seals the chip carrier 84 to the header 88. The chip carrier 84 and the sheet 86 mount within the rectangular cavity 88G, and the electrical pins 84B extend upward and through the header holes 88C that aperture the top face 88B. An electrical insulator cap 90 preferably mounts over the pins 84B to center the pins within the chip carrier holes, and to electrically isolate the pins from the header 88.

The overrange diaphragm 82, preferably formed with concentric convolutions in registration with the convolutions of the floor 30D (FIG. 3) of the mounting portion 30, is secured as by welding along the circular periphery, to the header bottom face 88H. The diameter of the diaphragm 82 is closely equal to the outer diameter of the header 88.

In the illustrated embodiment, the sensor assembly 80 seats in the annular mount 30C and the overrange diaphragm 82 overlies the first pressure passageway 36. This configuration places the diaphragm 82 proximate to both the chip carrier 84 and the housing 15. The sensor assembly 80 is secured and sealed to the mounting portion 30 by welding the header 88, along its upper peripheral edge, to the annular mount 30C, with a weld 32, FIG. 8.

With this structure, the overrange diaphragm 82 is located proximate to the chip carrier 84 and is subjected, on opposite sides, to pressures responsive to the same high and low pressures to which the sensing element 89 is subjected. The overrange diaphragm 82 thus effectively protects the sensing element 89 from overrange pressure conditions by flexing far enough during overrange to allow isolation diaphragms 46A and 46B to bottom out against the convoluted recesses 41A and 41B, thereby limiting the range of excess pressure communicated to the sensing element.

Placing the overrange diaphragm 82 proximate to the housing 15 and to the chip carrier 84 allows the body element 16 to be fabricated in a variety of ways. For example, the body element 16 can be a one-piece machined casting, as illustrated. Alternatively, it can be constructed from multiple machined cast layers, similar to the pressure transmitter marketed by The Foxboro Company, USA, under the trade designation 843 Differential Pressure Transducer. In addition, this integral configuration allows the process diaphragms to have different positions, e.g. planar as the diaphragms 46A and 46B in FIGS. 2–8, or bi-planar as described below with reference to FIGS. 1, 9 and 10.

The overrange diaphragm 82 and the flame arrestors 68,70 produce a time constant analogous to an electrical RC time constant that dampens fluid noise resulting from pipe vibrations, mechanical shocks, and like mechanical disturbances. The flame arrestors 68,70 have a combined characteristic flow resistance preferably of about 500 (psi)(sec)/in$^3$, and the overrange diaphragm 82 has a characteristic compliance or hydraulic capacitance preferably of about 0.0003 in$^3$/psi. The arrestors 68,70 and the diaphragm 82 are, fluidwise, connected in series, and produce, with these particular parameters, a hydraulic time constant of about 150 milliseconds. This time constant allows the sensor to have high sensitivity to the pressure being measured while significantly attenuating high frequency perturbations, i.e., noise in the fluids being measured.

Referring again to FIGS. 4 and 8, a fill tube 92 seats in the third opening 88F in the header 88, and a tube 94 seats in the second opening 88E. A U-shaped tube 96 has one end that seats in the first opening 88D and a second end that mounts to the protrusion 70A of the flame arrestor 70. The fill tubes 92 and 94, and openings 88F and 88E, respectively, provide structure for filling the high and low pressure sides of the pressure transmitter 10 with fill fluid.

As noted above, the pressure transmitter 10 employs an incompressible fill fluid, such as a relatively viscous hydraulic liquid, to couple to the sensing element 89 pressure conditions it receives at the process diaphragm 46A and 46B. With reference to FIGS. 6 and 8, the transmitter 10 is filled with a fill fluid by evacuating the passages within the body element 16 of the assembled housing 15 of the pressure transmitter 10. Typically, vacuum adaptors are secured to the fill tubes 92 and 94 to purge the apparatus of air, moisture, solvents, condensates or residues. Fill fluid is then introduced to the evacuated passages through these fill tubes. When the filling operation is complete, the ends of the tubes located distal from the header top face 88B are crimped and sealed closed. The fill fluid preferably passes into a defined low pressure side and a defined high pressure side of the transmitter 10. By way of example, in the low pressure side, the fluid passes from the fill tube 94 into the cross-bore opening 88I, to the chip carrier top face 84C, which is illustrated as the transducer low pressure side. The fill fluid further flows about the periphery of the header 88 and into the pressure passageway 36, in which the flame arrestor 68 is seated. From the passageway 36, the fluid flows through the pressure opening 34 to the back side of the process diaphragm 46A, FIG. 8. The fill fluid for the designated high pressure side passes from the fill tube 92 and the opening 88F to the chip carrier bottom face 84D, e.g., the transducer high pressure side, and through the opening 88D and the U-tube 96. The fluid further flows through the axially extending bore 70C and the transverse cylindrical channel 70D of the flame arrestor 70, and into the pressure passageway 38. From the pressure passageway 38, the fill fluid flows through the second pressure opening 35 to the back side of the process diaphragm 46B.

One feature of the foregoing construction of the pressure transmitter 10 is that it requires only a relatively small volume of fill fluid. It hence operates with a relatively small quantity of fill fluid which enhances the operating performance. The matched convoluted contours of the header bottom face 88H, of the overrange diaphragm 82 and of the floor 30D of the mounting portion contribute to attaining this small fill fluid space.

Referring to FIGS. 6 and 7, each pressure passageway 36 and 38 in the body element 16 is in communication pressurewise with one recessed chamber 62 and 61, respectively. That is, the process fluid applied to chamber 61 acts on the process diaphragm 46B, which transfers process fluid pressure fluctuations to the sensing element 89 by way of the fill fluid in the pressure opening 35, in the passageway 38, and in the U-tube 96. Similarly, process fluid pressure fluctuations applied to the chamber 62 are transferred to the sensing element 89 by way of the fill fluid in the opening 34, in the passageway 36, and in the header opening 88I.

During operation of the transmitter 10, the fill fluid in the pressure openings 34, 35 and in the passageways 36, 38, communicates to the sensing element 89 the input process line pressures, applied via process ports 24A, 24B (FIG. 3), that act on the planar isolation diaphragms at 46A and 46B (FIG. 8). The sensing element 89 accordingly generates a signal, in response to the applied pressures, indicative of the pressure difference between the two pressure inputs. The signal is processed by associated electronic circuitry resident in the casing 13, FIG. 1, and an output signal can be displayed via the output display 12, or can be applied to other external devices, e.g., a computer.

Figure 9:
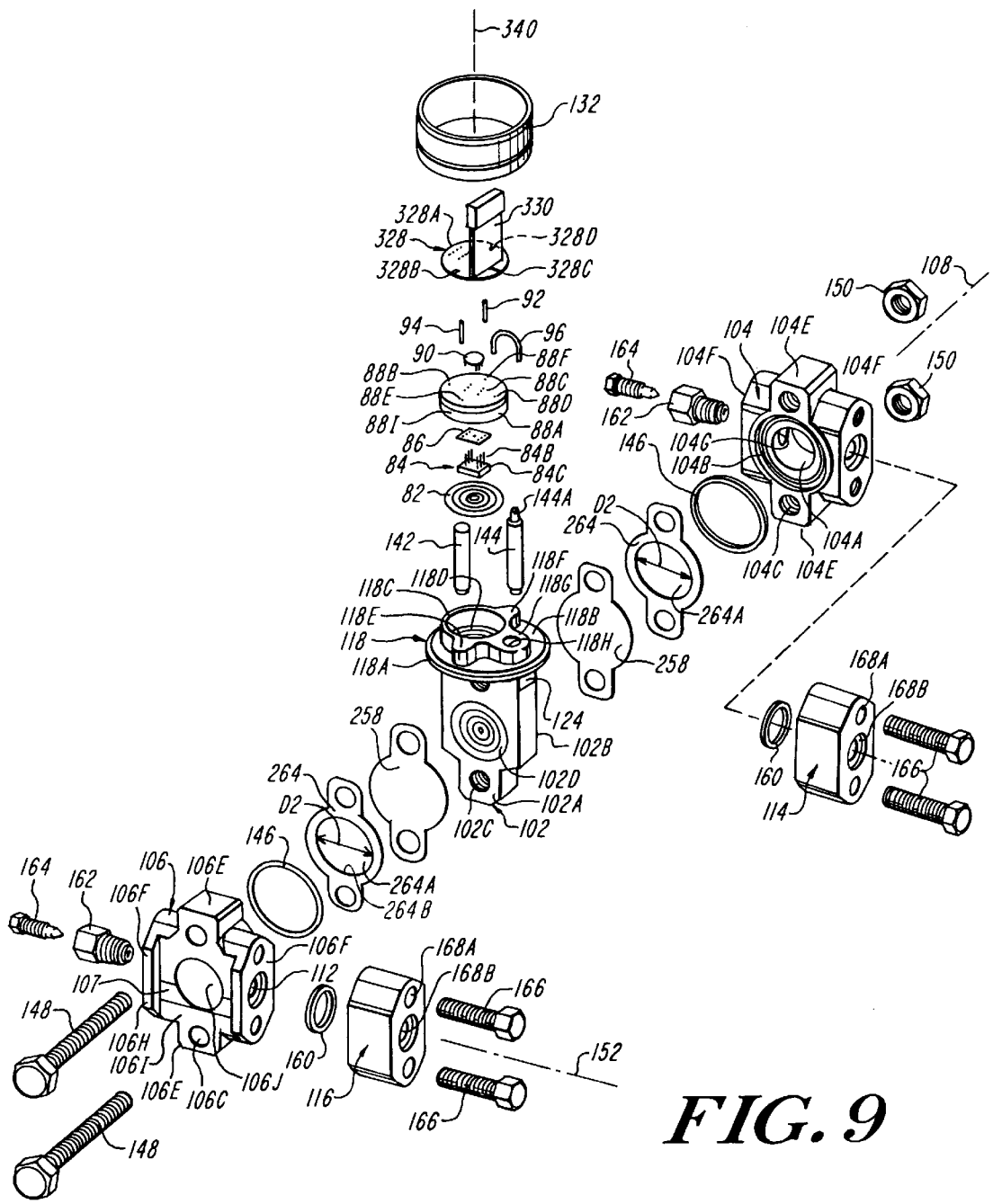
FIG. 9 is an exploded view of a preferred embodiment of a bi-planar pressure transmitter according to the invention.

FIG. 9 shows, in disassembled and exploded form, a second and preferred embodiment of a bi-planar pressure transmitter 100 embodying further features of the invention. The pressure transmitter 100, which receives two side-by-side pressure input lines like the transmitter 10 described above, has opposed pressure diaphragms instead of ones lying in the same plane as in the transmitter 10. The pressure transmitter 100 includes a web 102 that is clamped between elbow-type flanges 104 and 106. The web is preferably symmetrically centered in the transmitter 100, along a first normally horizontal axis 108, and has a rounded periphery to reduce the number of sharp contours. The flanges form input pressure ports 110 and 112, to which process connectors 114 and 116 typically are bolted. The transmitter 100 is illustrated as having a transducer mounting portion 118 that seats a sensor assembly 120, similar respectively to the mounting portion 30 and the sensor assembly 80 of the transmitter 10.

More particularly, the illustrated web 102, FIG. 9, has opposed and parallel first and second normally vertical surfaces 102A and 102B. Vertically spaced bolt holes 102C aperture the web 102 and extend, parallel to the axis 108 and transverse to a first, normally vertical axis 340, between the two surfaces 102A and 102B. The normally vertical surfaces 102A and 102B are recessed, preferably identically, with a set of concentric convolutions 102D. Each illustrated set of convolutions forms a sinusoidal profile.

The web 102 has an integrally formed and upwardly-extending neck portion 124 that mountingly connects to the transducer mounting portion 118. The illustrated transducer mounting portion 118 is similar to the transducer mounting portion 30 of FIG. 2, and has a first annular surface 118A and a second stepped concentric surface 118B. An upwardly extending tubular mount 118C is integral with the second surface 118B, and extends axially upward therefrom to be uppermost on the web. The surfaces 118A and 118B are concentric with the axis 122, and the mount 118C is radially offset therefrom. The illustrated transducer mounting portion 118 has three integral and circumferentially-spaced flared portions 118E,118F, and 118G. Flared portion 118G overlies the second pressure passageway 136 and is apertured with a bore 118H that aligns with that passageway. The mount 118C preferably circumscribes the first pressure passageway 134. Within the tubular mount 118C, the second surface 118B forms a mounting floor 118D that has an undulating contour, again preferably formed by concentric convolutions.

An instrument casing 130 (FIG. 1) mounts on the transmitter web 102 above the neck portion 124 by seating on a collar 132 that seats on the web in the annular lip formed by the first surface 118A, and the periphery of the stepped second surface 118B. In a preferred embodiment, the collar 132 is welded to the transducer mounting portion 118 of the web 102 along this lip.

Figure 10:
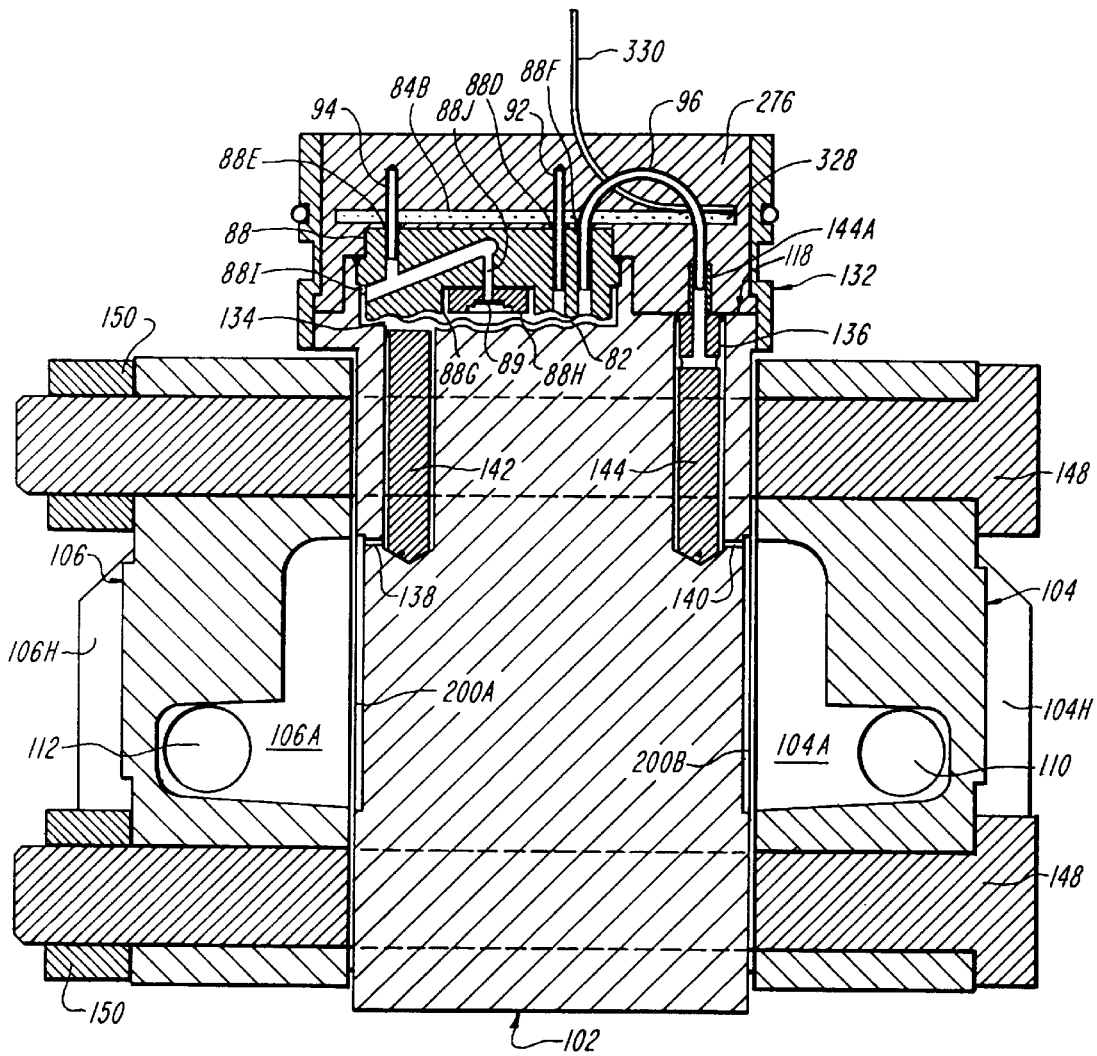
FIG. 10 is a diagrammatic elevation view, in section, of the pressure transmitter of FIG. 9, as assembled and with elements diagrammatically relocated.

As also shown in FIG. 10, first and second pressure passageways 134 and 136 open onto the second surface 118B of the mounting portion 118, and extend vertically within the web 102. The first and second pressure passageways 134,136 communicate with transverse, i.e. horizontally-extending, first and second pressure openings 138 and 140, respectively, formed in the web 102. The pressure passageways 134 and 136 and the openings 138 and 140 communicate the pressures applied to the diaphragms 200A and 200B mounted at the opposed web faces 102A and 102B, at the recesses, to the transducer mounting portion 118. Flame arrestors 142 and 144, similar to the flame arrestors of FIG. 4, seat in the first and second pressure passageways 134 and 136, respectively. Those of ordinary skill will recognize that two flame arrestors may not always be needed, particularly when all potential flame sources are on one side only of the sensor assembly 120.

Pressures applied to the input ports 110 and 112 of the flanges 106,104 are coupled to the diaphragms and thus the convoluted recesses of the web 102 with further structure, as now described with reference to FIGS. 9 and 10. Each illustrated flange 104 and 106 is preferably a one-piece machined metal casting and forms one input pressure port 110 and 112, respectively. A rear face of the flange 106 is recessed with a chamber 106A, illustratively of substantial circular cross-section that overlies the recessed convolutions 102D of the web surface 102A. Likewise, a rear face of the flange 104 is recessed with a chamber 104A that overlies the recessed convolutions (not shown) of the web surface 102B. Gasket grooves, for example groove of flange 104,104B are concentric with the chambers 104A and 106A, respectively, and seat deformable gaskets 146. Bolt holes 104C and 106C extend through the flanges 104 and 106, in alignment with the bolt-holes 102C in the web 102, and receive bolts 148,148. The illustrated transmitter 100 is assembled with two bolts 148,148 that extend through the two flanges and through the web 102 and are secured by nuts 150,150.

Each illustrated flange 104 and 106 has two oppositely-disposed bolt shrouds 104E, 104E, and 106E,106E, configured as shown, each of which encloses and thereby shrouds the portion of a bolt 148 that extends beyond the web 102. Further, the web 102 encloses and thereby shrouds the length of each bolt 148 which extends between the flanges. The assembly of this bolt shrouding structure of the web 102 and of the two flanges 104 and 106 forms a continuous enclosure over each bolt 148 along the passage thereof between the three assembled parts 102,104 and 106. The resultant full shrouding of each bolt 148,148 enhances the operational safety of the pressure transmitter 100, including a reduction of the potential to leak process fluids applied to the pressure ports 110 and 112, caused by unequal thermal expansion of the bolts and assembly.

Each illustrated pressure port 110 and 112 extends parallel with a second normally-horizontal axis 152 that is perpendicular to the axes 108 and 340. Each illustrated pressure port 110 and 112 opens at a side peripheral surface of each flange 104,106, respectively, and which is illustrated in FIG. 9 as the surface that faces to the right.

With further reference to FIGS. 9 and 10, each illustrated flange 104,106 has a pair of opposed peripheral faces 104F, 104F and 106F, 106F. A threaded passage 104G extends from each peripheral face 104F to the chamber 104A. The two passages 104G,104G of the flange 104 are coaxial along an axis parallel to the axis 152 and intersect the chamber 104A at opposite ends of a geometrical chord that is offset from a horizontal diameter of the circular cross-section of the illustrated chamber 104A.

Figure 11:
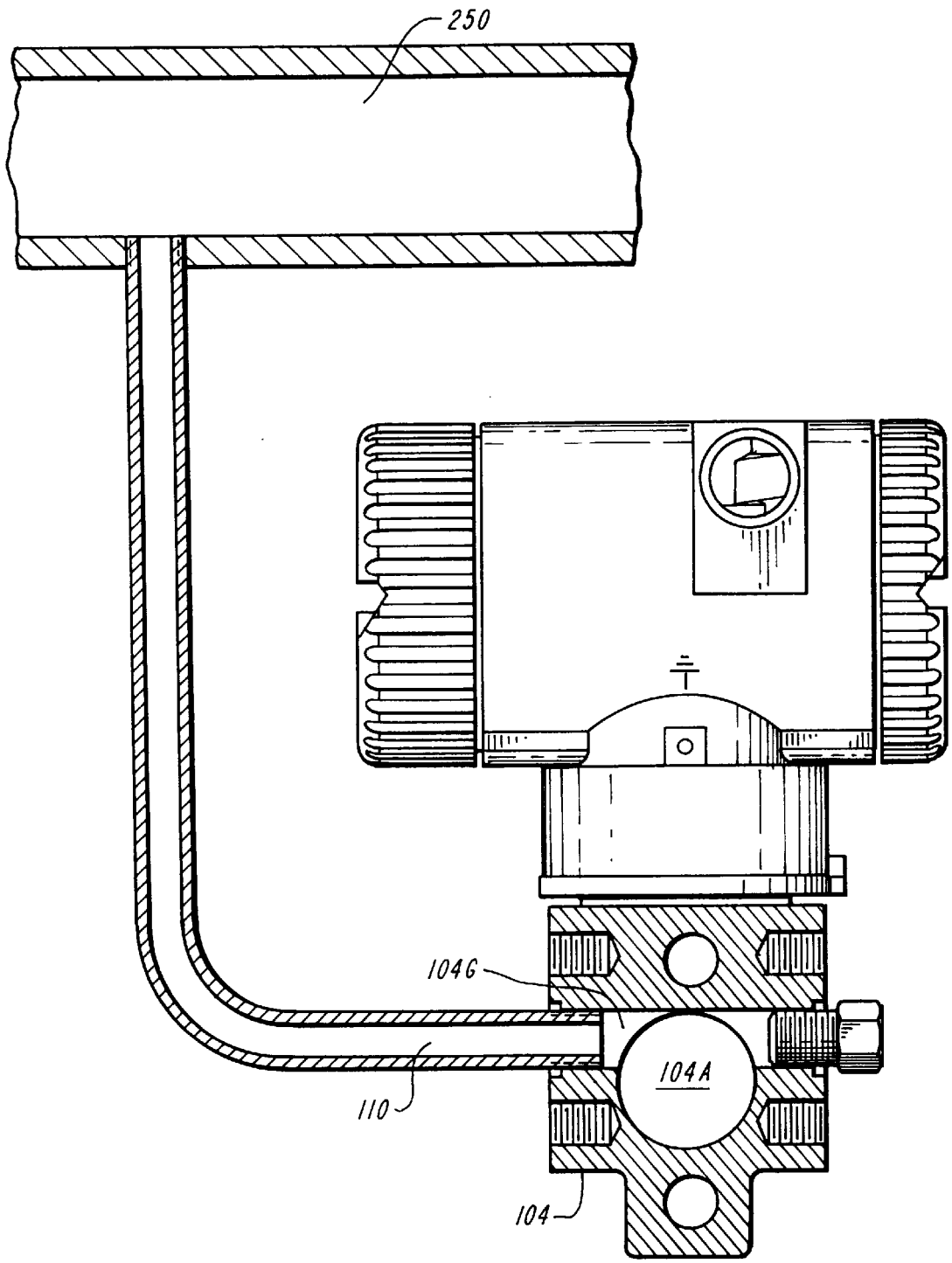
FIG. 11 shows the pressure transmitter of FIG. 1 connected with a process pipe and oriented for purging gas.
Figure 12:
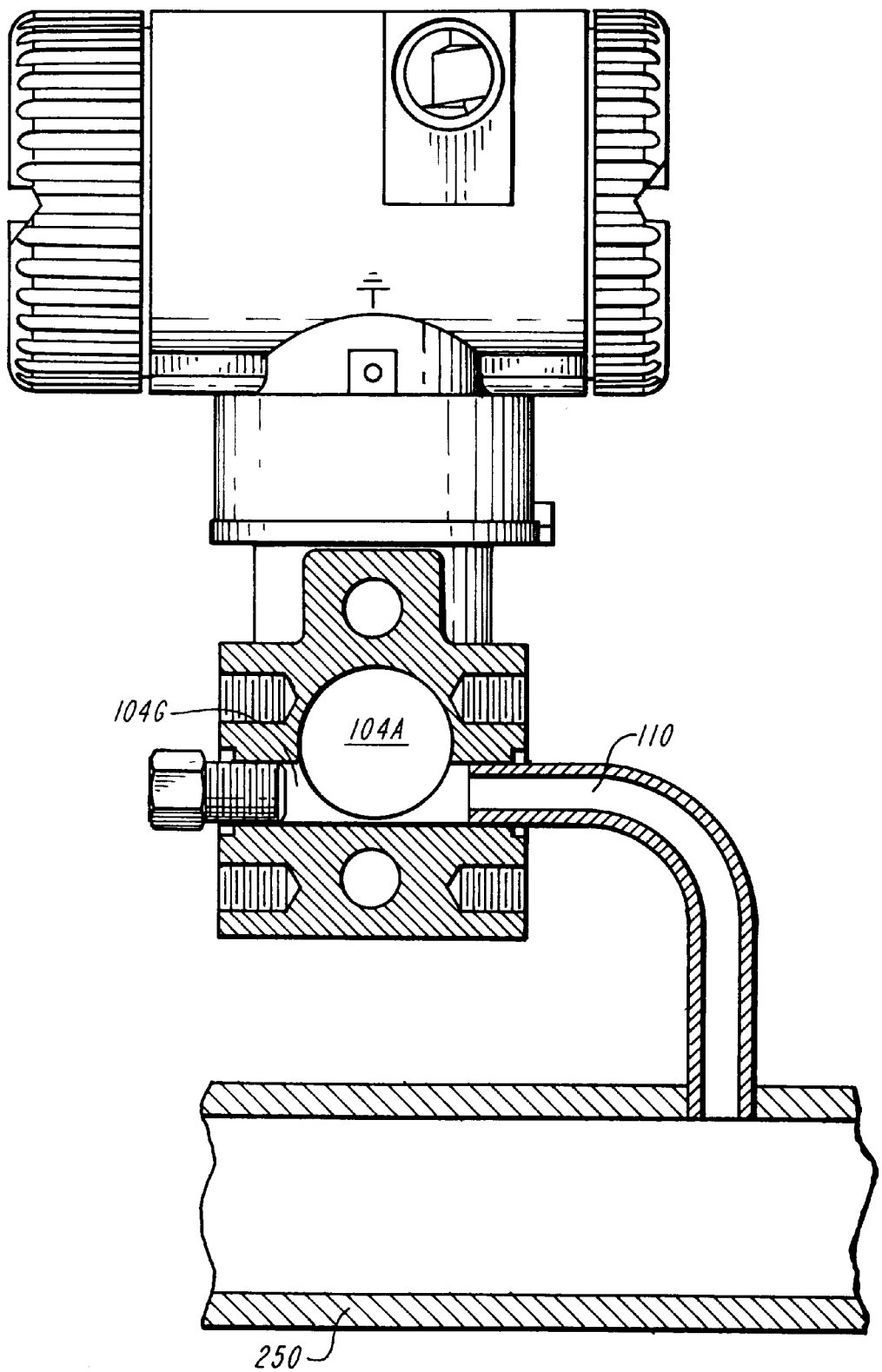
FIG. 12 shows the pressure transmitter of FIG. 1 connected with a process pipe and oriented for draining liquid.

In the upright orientation of the flange 104 shown in FIGS. 9 and 12, the opposed passage 104G enters the chamber 104A below the middle of the chamber, e.g., below the horizontal diameter. Accordingly, the passage 104G can function as the pressure port 110 to receive process fluid to be measured and also can be used to drain liquid including condensate from the flange 104. The flange can, alternatively, be inverted so that the passage 104G is vertically above the middle of the chamber 104A as shown in FIG. 11, in which case one passage can be used to purge gases that can collect in the chambers. Likewise, the flange 106 has a transverse passageway formed therein identical to passage 104G of flange 104, to assist in draining and in purging operations.

Operation for self-venting with liquids is shown in FIG. 11. Any gases will rise in chamber 104A and return to the process fluid in pipe 250. Similarly, when positioned as in FIG. 12, the flange 104 provides self-draining operation for gases, and liquid in chamber 106A and in connecting passages returns to the process stream in pipe 250. Most other orientations of the transmitter 130 (FIG. 1) also provide either self-draining or self-venting operation.

The opening of each passage 104G to a face 104F includes a recess for seating a mating protrusion in each process connector 114 and for seating a circular seal 160, when that passage functions as the pressure port 110. An optional filter screen can be mounted within each flange 104,106 to remove particulate matter present in the input process medium. When the flange passage functions as a purge for gases, as illustrated in FIG. 11, a vent body 162 is threaded therein. The vent body has a ventilation through-bore and a ventilation needle 164 removably and replaceably seats in the bore for selectively closing it and, alternatively, opening it to purge fluids. The vent body allows an operator to break vacuum and allow the chamber to drain. Either a vent body or a vent plug can be used in ports 110, 112 depending on operator needs or transmitter orientation. Optionally, an additional vent body can be positioned at a further threaded hole (not shown) into the chamber in the rear of the flange 106I at location 106J to provide further venting and draining flexibility.

The further structure of the flange faces 104F, 104F includes recessing each with threaded holes that receive bolts 166 for mounting a process connector 114 at the pressure port 110. The threaded bolt holes extend into each flange parallel with the axis 152. The process connector 114 overlies the pressure port 110 and has through bolt-holes 168A and an input passageway 168B, at locations complementary to the bolt-holes and to the passage 104G that forms the pressure port 110.

Thus, the illustrated flange 104 can be used in the upright orientation shown in FIG. 9 or in the inverted orientation, as desired and depending on whether primarily liquid or vapor is to be vented. Further, the flange can be operated with either peripheral face 104F providing the input port 110 and, alternatively, providing the venting port.

The flange 106 preferably is identical to and hence interchangeable with the flange 104. The flange 106 hence has opposed faces 106F,106F, and opposed passages 106G, 106G for venting and for input porting. A process connector 116 is mounted by bolting at the input port 112, and a vent body 162, removably and replaceably seating a vent needle 164, is threaded into the opposing passage 106G.

When the transmitter is assembled with both flanges 104, 106, installed for venting gas or for draining liquid, installation of the transmitter oriented with 180° clockwise rotation about the axis 108, FIG. 9, will still orient the flanges 104 and 106 either in a self-venting position or in a self-draining position.

With further reference to FIG. 9 and to the assembled transmitter of FIG. 10, the flange 106 has a pair of ribs 106H, 106H, each of which forms part of one peripheral face 106F. The two ribs outwardly extend from the flange front face 106I, on opposite sides of the front face. The flange front face 106I (side opposite the chamber 106A) preferably has formed thereon an orientation indicator 107 that indicates whether the flange is oriented to purge gas or is inverted to drain liquid. Likewise, the flange 104 has a pair of ribs 104H, 104H and an orientation indicator.

The illustrated orientation indicator is located, on the flange face 106I, corresponding to the location of the passages 106G, 106G off-center relative to the chamber 106A. The illustrated orientation indicator 107 includes a boss located off-center on the flange 106, i.e. vertically off-center for the upright orientation of FIG. 9, and lineally extending horizontally for an upright flange orientation.

As also shown in the exploded view of FIG. 9, the pressure transmitter 100 employs two diaphragm plates 258,258, configured complementary to the surface 102A and 102B of the web 102. The diaphragm plates overlie the web faces 102A,102B, thus covering the corrugated regions, e.g. region 102D, formed on both faces. Each diaphragm plate has punched holes at locations complementary to the bolt-holes 102C. The diaphragm plates preferably form first and second bi-planar process diaphragms 200A and 200B, FIG. 10. Weld plates 264,264, configured complementary to the web surfaces 102A and 102B, overlie the exposed faces of the diaphragm plates 258. Each weld plate has a circular opening 264A having a diameter D2 equal to or slightly smaller than the outer diameter of the convoluted regions 102D,102E. Each weld plate 264 hermetically seals the diaphragm plate 258 to the web 102, as by forming a laser or other penetrating weld 264B to the web 102 at the periphery of the plate 264 and at the circumference of the opening 264A. The deformable gaskets 146,146 mount over the welds 264B formed around the openings 264A. The diameter of each gasket preferably is smaller than the diameter of the weld line at the circumference of each opening 264A, to ensure that process fluid does not wet the weld connection.

The diameter of the circular chambers 104A, 106A is preferably equal to or slightly less than the diameter D2 of the weld plate openings 264A. In a preferred embodiment, each chamber 104A, 106A allows the input process medium applied by one pressure input line to act upon the entire portion of the diaphragm plate overlying one convoluted region 102D,102E, i.e. the portion that is circumscribed by the chambers 104A,106A.

Thus, in the assembled transmitter 100 (FIGS. 1 and 10), the illustrated axial succession of weld plates 264,264, the diaphragm plates 258,258, and the gaskets 146,146 is secured between the web 102 and the two flanges 104,106.

Referring again to FIG. 9, a sensor assembly 120, identical in structure and operational features to the sensor assembly 80 of FIG. 3, mounts in the annular mount 118C. The sensor assembly 120 includes an overrange diaphragm 82, a chip carrier 84, an epoxy mounting sheet 86, and a header 88. The illustrated header 88 has a substantially circular main body 88A having a flat top face 88B from which a series of transducer lead-out holes 88C and fill tube holes 88D, 88E, and 88F extend into the body 88A. Referring to FIG. 10, a substantially rectangular cavity 88G recesses an opposed bottom face 88H of the header 88. The illustrated header 88 has a first opening 88D and a third opening 88F, both of which extend between the header top and bottom faces 88B and 88H. A second opening 88E extends partly through the header body 88A and communicates with a cross-bore opening 88I, which in turn communicates with the chip carrier 84 by a substantially vertical bore 88J.

As best shown in FIG. 10, the illustrated chip carrier 84 has a dielectric body that mounts a pressure sensing element 89. Similar to the planar embodiment of FIGS. 2 through 8, this cross-sectional view of the sensor assembly 120 includes the fill tube 92 diagrammatically relocated for clarity of discussion. A set of electrical pins 84B, FIG. 9, is connected by wire bonds to the contacts of the sensing element 89 and extends upwardly from the top surface 84C.

As previously described with reference to FIGS. 4 and 6, the mounting sheet 86 seats over the chip carrier top surface 84C, and when heated to a selected elevated temperature, hermetically seals the chip carrier 84 to the header 88. The chip carrier 84 and the sheet 86 mount within the rectangular cavity 88G, and the electrical pins 84B extend upward and through the header holes 88C that aperture the top face 88B. The electrical insulator cap 90 preferably mounts over the pins 84B to center the pins within the chip carrier holes, and to electrically isolate the pins from the header 88.

The overrange diaphragm 82, preferably formed with concentric convolutions in registration with the circular ridges or convolutions of the floor 118D of the mounting portion 118C, is secured, for example, by welding along the periphery, to the header bottom face 88H. The diameter of the diaphragm 82 is closely equal to the outer diameter of the header 88.

In the illustrated embodiment of the bi-planar transmitter of FIG. 9, the sensor assembly 120 seats in the annular mount 118C and the overrange diaphragm 82 overlies the first pressure passageway 134 (FIG. 10). Similar to the planar embodiment of FIG. 6, this configuration places the diaphragm proximate to both the chip carrier 84 and the housing 15. The sensor assembly 120 is then secured and sealed to the annular mount 118C.

An electrical contact plate 328, which assembles onto the header 88, has a series of transducer holes 328A and a set of peripheral notches 328B, 328C, and 328D. A flexible electrical cable 330 is coupled at one end to the top plate 328 and extends upwardly therefrom. When the plate is properly positioned for assembly, the notches 328B, 328C and 328D are aligned to receive the fill tubes 94, 96 and 92, respectively. The transducer holes 328A seat over the portions of the electrical pins that extend beyond the insulator cap 90. The contact plate provides a secure electrical connection to the electrical pins 84B and thus to the sensing element 89. The flexible cable 330 carries the output electrical signals generated by the sensing element in response to pressure differences applied to the diaphragms 200A and 200B, to the associated electronic circuitry mounted within the casing 130.

Referring again to FIGS. 9 and 10, the fill tube 92 seats in the third opening 88F in the header 88, and the tube 94 seats in the second opening 88E. The U-shaped tube 96 has one end that seats in the first opening 88D and a second end that mounts to the protrusion 144A of the flame arrestor 144. The fill tubes 92 and 94, and openings 88F and 88E, respectively, provide structure for filling the high and low pressure sides of the transmitter 100 with fill fluids. In addition, FIG. 10 illustrates that a potting material 276 is cast within the sleeve 132 and embeds the sensor assembly 120 in the mount 118C. The potting material fills the volume within the sleeve 132 and protects the sensor assembly 120 and its associated electrical leads from mechanical shock, vibrations, and like disturbances, and excludes moisture and corrosive agents.

As also shown in FIGS. 1 and 9, the illustrated casing 130 has a neck 130A that seats over the sleeve 132 by threaded attachment thereto, and that, in turn, carries a housing portion 130B. The housing portion 130B preferably is divided into first and second internal compartments (not shown) and has a sealed opening that extends between the compartments. The illustrated casing housing portion 130B has a removable and replaceable cover 130H,130H at each end, i.e. on the left side and on the right side in FIG. 1, that is preferably sealed to the housing with a deformable gasket 182, to provide access to each internal compartment. The removable covers 130H, 130H allow a customer or maintenance personnel to connect the casing electronics to remote processing circuitry, as well as allow access to the housing electronics for testing and/or repair.

The flexible electrical cable 330, electrically connected at one end to the sensor assembly 120, extends upwardly into the casing 130 through the neck 130A and connects to the housing electronics. Typically, one cover has an optical window (FIG. 2) through which an output display can be viewed. In a preferred embodiment, the resident housing electronics includes resident software code and a receiver that allows a system operator, via a remote digital logic module transmitter, to electronically switch the high and low pressure sides of the pressure transmitter 100.

With reference to FIG. 1, the casing 130 can further include a boss structure 131 having a threaded throughbore 131A that forms a dormer-like structure. The boss structure 131 allows access to the casing interior when it is necessary to perform field tests. The throughbore 131 A provides structure through which the casing electronics can be connected to the remote processing circuitry. A second boss structure is present on the opposite side of the casing 130 as an alternate connection port.

The structures of the illustrated embodiments attain pressure transmitters that are compact, relatively lightweight and relatively low in cost. The pressure transmitters can also mount a read-out display positioned for relatively easy viewing. Furthermore, at least one transmitter embodiment attains large process diaphragms in a compact transmitter size, i.e. positioning the fastener-receiving apertures at the four corners of a non-square quadrilateral (FIG. 4) or by employing only a pair of bolts along a vertical axis, as in the bi-planar design (FIGS. 1 and 9). These configurations accommodate large process diaphragms without increasing the overall size of the transmitter.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. Pressure transmitter apparatus comprising
   A. unitary body means having, in a first orientation,
      (1) vertical surface means extending along a first vertical axis and apertured with first and second pressure openings disposed at substantially the same vertical location, and
      (2) transducer mounting means coupled to said body means and located, in said first orientation, vertically above said pressure openings,
   B. diaphragm means forming first and second process diaphragms respectively closing said first and second pressure openings,
   C. flange means removably and replaceably secured to said body means overlying said diaphragm means, said flange means forming first and second pressure ports for coupling first and second pressure inputs to said first and second process diaphragms, respectively,
   D. first and second pressure passages vertically extending at least partly within said body means for communicating respectively between said first and second pressure openings and said traducer mounting means,
   wherein said flange means includes a selectively closed further opening formed therethrough and offset along said first vertical axis and from said first and second pressure openings, said flange means being adapted to be invertably mountable over said vertical surface means in a draining position and alternatively in a purging position, for disposing said further opening for draining liquid when mounted in said draining position and for disposing said further opening for purging gas when mounted in said purging position.

2. Pressure transmitter apparatus according to claim 1, further comprising flame retardation means disposed within at least one of said vertically extending first and second pressure passages and located above said pressure openings which extend generally horizontally, and at least partly within said unitary body means, for introducing a flame barrier between said transducer mounting means and said pressure openings.

3. Pressure transmitter apparatus according to claim 1, wherein said unitary body means has neck means interconnecting said mounting means with said vertical surface means for providing thermal isolation therebetween.

4. Pressure transmitter apparatus according to claim 1, wherein said transducer mounting means comprises
   sensor means located, in said first orientation, above said pressure openings and in fluid communication with said first and second passages, and
   mounting means for mounting said sensor means.

5. Pressure transmitter apparatus according to claim 4, further comprising circuit means connected with said sensor means and selectively operable for electronically designating which of said first and second pressure inputs is a high pressure input.

6. Pressure transmitter apparatus according to claim 4, wherein said sensor means comprises
   housing means having opposed and substantially parallel first and second faces that are transverse to said first axis and that are axially spaced apart along said first axis, in said first orientation, and
   transducer means, located at least partly between said first and second faces, for generating a signal in response to the difference in pressure between said first and second pressure inputs applied to said first and second pressure ports.

7. Pressure transmitter according to claim 6, wherein said sensor means further comprises overrange protection means overlying said second face of said housing means and arranged in fluid communication with said first and second pressure passages, for protecting said transducer means from an overrange pressure condition, said overrange protection means overlying at least said first pressure passage and integrally arranged with said housing means of said sensor means.

8. Pressure transmitter apparatus according to claim 1, wherein said transducer mounting means comprises an annular support structure for mounting a sensor assembly and which extends, in said first orientation, along said first vertical axis.

9. Pressure transmitter apparatus according to claim 8, wherein said transducer mounting means further comprises a flat face disposed substantially orthogonal to said first axis in said first orientation, and from which said annular support extends, wherein one of said first and second pressure passages opens onto said face and within said annular support structure and wherein said other of said first and second pressure passages opens onto said flat face external of said annular support structure.

10. Pressure transmitter apparatus according to claim 9, further comprising a pressure sensor assembly coupled to said transducer mounting means and disposed in fluid communication with at least one of said first and second pressure passages, and having overrange protection means for protecting against an overrange pressure condition coupled to at least one of said pressure passages, said pressure sensor assembly being adapted for mounting within said annular support structure such that said overrange protection means overlies said pressure passage opening onto said flat face within said annular support structure.

11. Pressure transmitter apparatus according to claim 1, wherein said transducer mounting means comprises horizontal annular surface means coupled to said unitary body means and located, in said first orientation, vertically above said pressure openings, said horizontal annular surface means including means for seating a transducer element, and connection means for mounting an electronics housing to said horizontal surface means.

12. Pressure transmitter apparatus according to claim 11, wherein said connection means includes a stepped annular surface for seating said electronics housing.

13. Pressure transmitter apparatus according to claim 11, wherein said means for seating includes an annular transducer mount integrally formed on said horizontal annular surface means and extending outwardly from said means for seating.

14. Pressure transmitter apparatus according to claim 1, further comprising a pressure sensor assembly coupled to said transducer mounting means and disposed in fluid communication with at least one of said first and second pressure passages, and having overrange protection means for protecting against an overrange pressure condition coupled to at least one of said pressure passages.

15. Pressure transmitter apparatus according to claim 14, wherein said pressure sensor assembly comprises housing means having opposed and substantially parallel first and second faces that are transverse to said first axis and that are axially spaced apart along said first axis, in said first orientation, and a pressure sensing element, located at least partly between said first and second faces, for generating a signal in response to the difference in pressure between said first and second pressure inputs applied to said first and second pressure ports.

16. Pressure transmitter according to claim 15, wherein said overrange protection means overlies said second face of said housing means and is arranged in fluid communication with said first and second pressure passages, for protecting said pressure sensing element from an overrange pressure condition.

17. Pressure transmitter according to claim 1, further comprising overrange-protected sensor means for producing an electrical signal responsive to first and second pressure conditions applied thereto, said sensor means being seated with said mounting means in fluid communication with at least one of said pressure passages.

18. Pressure transmitter apparatus according to claim 17, further comprising at least first and second fastener apertures, each extending horizontally, when in said first orientation, through said body means and said flange means, said apertures being vertically spaced apart and disposed below said transducer mounting means and below said sensor means, and first and second threaded fasteners, each passing within the same-numbered fastener aperture for securing said body means and said flange means when assembled together.

19. Pressure transmitter apparatus according to claim 1, further comprising means forming apertures in both said body means and said flange means for mounting a plurality of fasteners, said apertures in said flange means being disposed in registration with said apertures in said body means when mounted together to facilitate seating of said fasteners, and fastener shrouding means on said body means and said flange means and shroudingly enclosing said fasteners in the aperture thereof throughout engagement with said flange means and with said body means.

20. Pressure transmitter apparatus according to claim 1, further comprising seal means engaged between said diaphragm means and said flange means for sealing each pressure port with respect to one process diaphragm, and first and second weld connections, each sealingly securing the same-numbered process diaphragm to said body means at said same-numbered pressure opening, each said weld connection being isolated from contact with fluids at said pressure inputs by said seal means.

21. Pressure transmitter apparatus according to claim 1, further comprising first and second flame arrestor means vertically disposed respectively in said first and second pressure passages, for introducing flame barriers between said transducer mounting means and said pressure openings.

22. Pressure transmitter apparatus according to claim 1, wherein said vertical surface means includes a pair of parallel surface elements spaced apart in a direction orthogonal to said first axis, and said first and second pressure openings are oppositely arranged and substantially parallel to each other and said pressure passages are formed within said body means between said surface elements.

23. Pressure transmitter apparatus according to claim 22, wherein said flange means comprises cover means forming first and second process covers overlying said first and second process diaphragms, respectively, each said process cover being apertured with at least one fastener-receiving opening.

24. Pressure transmitter apparatus according to claim 23, wherein said diaphragm means further comprises a pair of diaphragm sheets forming first and second process isolation diaphragms respectively closing said first and second pressure openings formed, and a pair of weld plates each having means forming an aperture dimensioned and sized to define the first and second process diaphragms, each said weld plate being configured to overlie each said diaphragm sheet and for mounting between said vertical surface means and said flange means when said pressure transmitter is assembled.

25. Pressure transmitter apparatus according to claim 22, further comprising plural bolt-type fastener means for removably and replaceably securing said flange means to said body means, and first shroud means formed on said body means for shroudingly enclosing at least a selected length of each said bolt-type fastener means, and second shroud means for shroudingly enclosing at least a selected length of each said bolt-type fastener means, said first and second shroud means, in combination, shroud nearly the entire length of said fastener means.

26. Pressure transmitter apparatus according to claim 25, wherein said fastener means for removably and replaceably securing said flange means to said body means consist of two threaded fasteners, each extending through said flange means and said body means.

27. Pressure transmitter apparatus according to claim 22, further comprising overrange-protected sensor means for producing an electrical signal responsive to first and second pressure conditions applied thereto, said sensor means being seated with said mounting means in fluid communication with at least one of said pressure passages.

28. Pressure transmitter apparatus according to claim 1, further comprising an upwardly extending neck portion of relatively low thermal conductivity, said transducer mounting means being integrally formed with said neck portion to be relatively thermally isolated from and located above said pressure openings, said first and second diaphragms respectively sealing said pressure openings on said vertical surface means, and wherein said flange means forms first and second flange elements, each removably and replaceably secured to said body means over the same-numbered diaphragm element, each said flange element having said pressure port extending therethrough, and a differential pressure sensor secured on said transducer mounting means and disposed, in said first orientation, above said pressure openings, wherein said first and second passages communicate respectively between said first and second pressure openings and said differential pressure sensor, for separately communicating to said sensor first and second pressures responsive to pressures applied to said first and second pressure ports.

29. Pressure transmitter apparatus according to claim 1, further comprising orientation designation indicia visibly disposed on said flange means for having a visibly apparent different relative position depending on the mounting position of said flange means.

30. Pressure transmitter apparatus according to claim 1, wherein said vertical surface means is planar and wherein said first and second pressure openings are in a common plane.

31. Pressure transmitter apparatus according to claim 30, wherein said flange means comprises unitary cover means forming a process cover overlying said first and second process diaphragms, respectively.

32. Pressure transmitter apparatus according to claim 30, further comprising aperture means aperturing said vertical surface means and forming first fastener-receiving apertures in said body means, said first fastener-receiving apertures being located at the corners of a path bounding a non-square quadrilateral having an acute included angle.

33. Pressure transmitter apparatus according to claim 32, wherein said flange means includes aperture means forming second fastener-receiving apertures at locations substantially complementary to said first fastener-receiving apertures, and further including plural fasteners for seating in said first and second apertures for removably and replaceably securing said flange element to said body element, wherein said first and second apertures are located at each of different corners of a path bounding a non-square quadrilateral.

34. Pressure transmitter apparatus according to claim 32, wherein said quadrilateral path is a parallelogram having an acute included angle, for example, between about 30 and 40 degrees.

35. Pressure transmitter apparatus according to claim 32, further comprising plural bolt-type fasteners for removably and replaceably securing said flange means to said body means, and a first shroud formed on said body element for shroudingly enclosing at least a selected length of each said bolt-type fastener, and wherein said flange element includes a second shroud for shroudingly enclosing at least a selected length of each said bolt-type fastener, said first and second shrouds, in combination, shroud the entire length of said fastener.

36. Pressure transmitter apparatus according to claim 32, wherein said body means has a front face formed by said vertical surface means and has a rear face, wherein said first fastener-receiving apertures extend between said front and rear faces, and partly extend through said flange element, for mounting fasteners from said rear face of said body means.

37. Pressure transmitter apparatus according to claim 32, wherein said diaphragm means includes a single diaphragm sheet forming first and second process isolation diaphragms respectively closing said first and second pressure openings.

38. Pressure transmitter apparatus according to claim 30, further comprising plural bolt-type fasteners for removably and replaceably securing said flange means to said body means, and a first shroud formed on said body element for shroudingly enclosing at least a selected length of each said bolt-type fastener, and wherein said flange element includes a second shroud for shroudingly enclosing at least a selected length of each said bolt-type fastener, said first and second shrouds, in combination, shroud the entire length of said fastener.

39. Pressure transmitter apparatus according to claim 30, further comprising at least one flame arrestor disposed within at least one of said first and second pressure passages and extending at least partly within said body element, for introducing a flame barrier between said transducer mount and said body element.

40. Pressure transmitter apparatus according to claim 30, further comprising an upwardly extending neck portion of relatively low thermal conductivity, wherein said transducer mounting means is integrally formed with and carried on said neck portion to be relatively thermally isolated from said pressure openings and located thereabove, and a pressure sensor secured on said transducer mounting means and disposed, in said upright orientation, above said pressure openings.

41. Pressure transmitter apparatus according to claim 30, wherein said diaphragm means includes a single diaphragm sheet forming first and second process isolation diaphragms respectively closing said first and second pressure openings.

42. Pressure transmitter apparatus according to claim 30, further comprising overrange-protected sensor means for producing an electrical signal responsive to first and second pressure conditions applied thereto, said sensor means being seated within said transducer mounting means in fluid communication with at least one of said pressure passages.

* * * * *